US009223376B2

(12) United States Patent
Derbyshire et al.

(10) Patent No.: US 9,223,376 B2
(45) Date of Patent: Dec. 29, 2015

(54) MANAGING ELECTRICAL CURRENT IN A PORTABLE COMPUTING DEVICE WHEN TWO OR MORE COMMUNICATIONS OVERLAP IN DRAWING POWER DURING A TRANSMISSION

(71) Applicant: QUALCOMM Incorporated, San Diego, CA (US)

(72) Inventors: Amy Derbyshire, Boulder, CO (US); Francis Ngai, Boulder, CO (US); Ali Taha, San Diego, CA (US); Eric Mikuteit, San Diego, CA (US); Michael Lee McCloud, San Diego, CA (US); Amit Mahajan, San Diego, CA (US); David Coronel, San Diego, CA (US); Prashanth Akula, San Diego, CA (US); Todd Sutton, San Diego, CA (US); Hardik Patel, San Diego, CA (US); Hector Corleto, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 13/844,204

(22) Filed: Mar. 15, 2013

(65) Prior Publication Data

US 2013/0254579 A1    Sep. 26, 2013

Related U.S. Application Data

(63) Continuation-in-part of application No. 13/428,154, filed on Mar. 23, 2012, now Pat. No. 9,087,114.

(51) Int. Cl.
*G06F 1/00* (2006.01)
*G06F 11/30* (2006.01)
(Continued)

(52) U.S. Cl.
CPC .. *G06F 1/28* (2013.01); *G06F 1/26* (2013.01); *G06F 1/30* (2013.01); *G06F 1/3203* (2013.01);
(Continued)

(58) Field of Classification Search
CPC ............ G06F 1/3203; G06F 1/30; G06F 1/26
See application file for complete search history.

(56) References Cited

U.S. PATENT DOCUMENTS 7,340,623 B2   3/2008  Kato et al.
7,421,291 B2   9/2008  Karaoguz et al.
(Continued)

FOREIGN PATENT DOCUMENTS

JP   2008005031 A   1/2008

OTHER PUBLICATIONS

International Search Report and Written Opinion—PCT/US2014/024521—ISA/EPO—Jun. 26, 2014.
(Continued)

*Primary Examiner* — Mohammed Rehman
*Assistant Examiner* — Gayathri Sampath
(74) *Attorney, Agent, or Firm* — James Gutierrez

(57) ABSTRACT

A method and system for managing electrical current within a portable computing device ("PCD") includes assigning a priority to two or more communications supported by the PCD. A present level of a power supply for the PCD may be monitored by a communications power ("CP") manager module. Next, the CP manager module may determine if the two or more communications may be transmitted at the present level of the power supply. If the two or more communications cannot be transmitted at the present level of the power supply, then the CP manager module may determine if a timing of at least one of the communications may be adjusted. The CP manager module may also determine a theoretical power level adjustment for at least one of the communications. The two or more communications may be transmitted with any calculated timing off sets and power level adjustments.

36 Claims, 13 Drawing Sheets

(51) Int. Cl.
*G06F 1/28* (2006.01)
*G06F 1/32* (2006.01)
*G06F 1/30* (2006.01)
*G06F 1/26* (2006.01)
*H04W 52/02* (2009.01)

(52) U.S. Cl.
CPC .............. *G06F 1/329* (2013.01); *G06F 1/3212* (2013.01); *G06F 11/3013* (2013.01); *G06F 11/3062* (2013.01); *H04W 52/0277* (2013.01); *Y02B 60/1292* (2013.01); *Y02B 60/144* (2013.01)

(56) References Cited

U.S. PATENT DOCUMENTS

| | | |
|---|---|---|
| 7,584,376 B2 | 9/2009 | Finkelstein et al. |
| 7,598,702 B2 | 10/2009 | Walrath |
| 7,725,094 B2 | 5/2010 | Chary |
| 7,934,107 B2 | 4/2011 | Walrath |
| 2004/0247993 A1 | 12/2004 | Johnson et al. |
| 2008/0004063 A1 | 1/2008 | Haapoja et al. |
| 2008/0161071 A1 | 7/2008 | Sherman |
| 2009/0098914 A1 | 4/2009 | Martin-Cocher et al. |
| 2009/0275355 A1 | 11/2009 | Tan et al. |
| 2010/0174501 A1 | 7/2010 | Myadam |
| 2010/0274507 A1* | 10/2010 | Black et al. ............. 702/63 |
| 2010/0291963 A1 | 11/2010 | Patel et al. |
| 2010/0313054 A1* | 12/2010 | Lee ............. G06F 1/3203 713/340 |
| 2011/0264933 A1 | 10/2011 | Forsythe |
| 2012/0007967 A1 | 1/2012 | Kondo et al. |
| 2012/0047379 A1 | 2/2012 | Chen et al. |
| 2012/0102497 A1* | 4/2012 | Stahl ............. 718/103 |
| 2012/0139753 A1 | 6/2012 | Finlay |
| 2012/0317432 A1* | 12/2012 | Assad et al. ............. 713/340 |
| 2013/0227327 A1 | 8/2013 | Chun et al. |

OTHER PUBLICATIONS

International Search Report and Written Opinion—PCT/US2013/027019—ISA/EPO—Jul. 11, 2013.

* cited by examiner

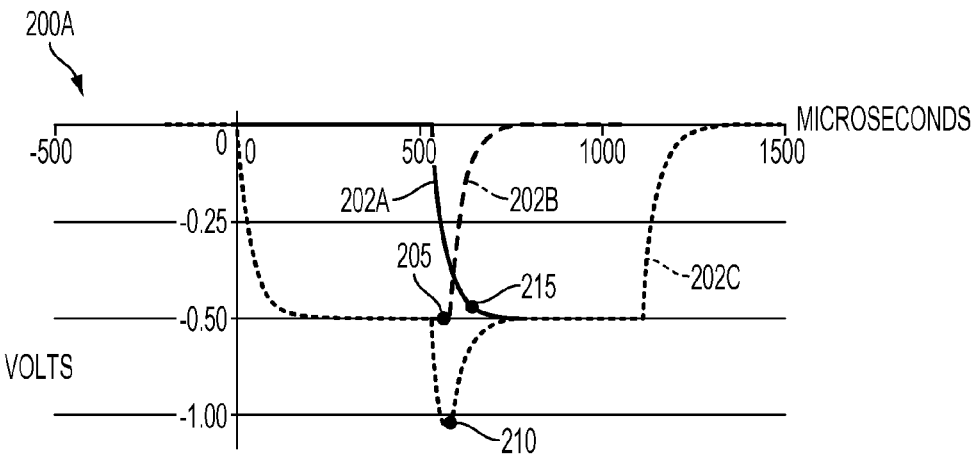
FIG. 2 – Conventional Art
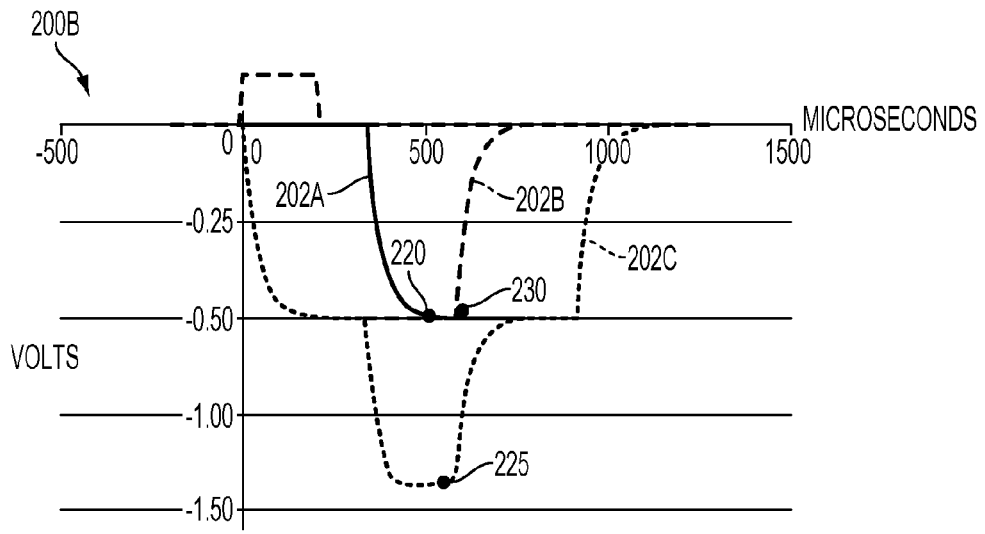
FIG. 3 – Conventional Art
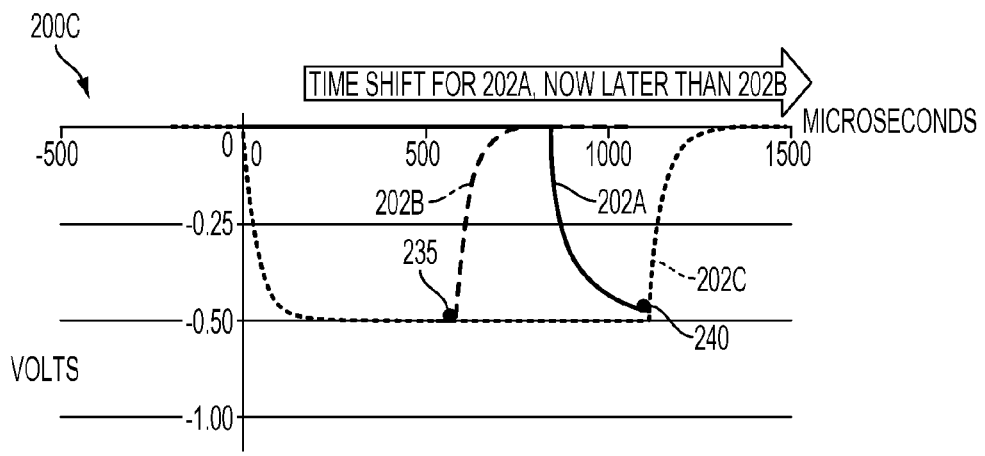
FIG. 4

| Communication Use Case | Power Adjustment Level for Low Priority | Iterations for Power Adjustment Level | Power Adjustment Level for High Priority | Iterations for Power Adjustment Level |
|---|---|---|---|---|
| Voice + Voice | 1 dB | 2 | 0.5 dB | 1 |
| Voice + Data | 2 dB | 2 | 0.1 dB or smaller | 1 |
| Data1 + Data2 | 2 dB | 1 | 0.5 dB | 1 |
| Equal Share | 0.1 db | 1 | 0.1dB | 1 |

*FIG. 5*

MANAGING ELECTRICAL CURRENT IN A PORTABLE COMPUTING DEVICE WHEN TWO OR MORE COMMUNICATIONS OVERLAP IN DRAWING POWER DURING A TRANSMISSION

PRIORITY AND RELATED APPLICATIONS STATEMENT

This continuation-in-part patent application claims priority under 35 U.S.C. §120 to U.S. Non-Provisional patent application Ser. No. 13/428,154, filed on Mar. 23, 2012, and entitled, "SYSTEM AND METHOD FOR MANAGING ELECTRICAL CURRENT IN A PORTABLE COMPUTING DEVICE." The entire contents of which are hereby incorporated by reference.

DESCRIPTION OF THE RELATED ART

Portable computing devices ("PCDs"), like mobile phones, usually have many rich features that are often accessed and run simultaneously. Such features are supported by many hardware elements which consume significant amounts of power. Power in most PCDs is delivered by one or more batteries. In mobile phones, like smart phones, this is usually a single battery having a form factor dictated by the size of the entire mobile phone.

The electrical current draw from the combination of these hardware elements simultaneously often can be excessively high such that the voltage across a single battery may drop significantly when hardware elements are operated simultaneously. Such a significant drop in voltage may directly impact memory. For example, data within memory may become corrupted and may require a system reset in order to correct the problem. Other hardware elements besides memory within a portable computing device may suffer degraded performance when a voltage drop occurs. For example, audio signals supplied to a speaker may be clipped or become choppy due to a voltage drop. For RF modems, a voltage drop may equate to phone calls being dropped.

Another problem that exists with mobile phones is the rationing of battery current available to a modem which may support Dual-Subscription, Dual-Active ("DSDA") scenarios, such as a Dual Subscriber Identity Module ("SIM") mobile phone. A Dual SIM mobile phone is one which usually holds two SIM cards. It is a Dual phone with active modes which means both the SIM cards may be active all the time to support data and voice communications simultaneously.

One Dual active scenario is as follows: a first SIM 1 is used in a mobile phone for voice calls while a second SIM 2 in the same mobile phone may be used for Internet surfing. Each SIM is always active in which the user may receive and transmit data via both SIMs, at the same time.

In other use scenarios, battery current of a mobile phone may be consumed by device components other than modem, such as a display playing video. Meanwhile, a State Of Charge (SOC) of the battery is going down as the battery drains to support the phones multiple functions such as supporting a phone call while playing a video.

Therefore, there is a need in the art for a system and method that manages available electrical current such that PCD functionality is optimized.

SUMMARY OF THE DISCLOSURE

A method and system for managing electrical current within a portable computing device ("PCD") includes assigning a priority to two or more communications supported by the PCD. A present level of a power supply for the PCD may be monitored by a communications power ("CP") manager module. Next, the CP manager module may determine if the two or more communications may be transmitted at the present level of the power supply. If the two or more communications cannot be transmitted at the present level of the power supply, then the CP manager module may determine if a timing of at least one of the communications may be adjusted. If the timing of the at least one of the communications may be adjusted, then CP manager module may calculate a timing offset for the at least one of the communications.

Next, the CP manager module may determine if the two or more communications may be transmitted at the present level of the power supply and with the timing offset. The two or more communications may be transmitted with the timing offset if the communications may be supported with the present level of the power supply and with the timing offset.

The CP manager module may also determine a theoretical power level adjustment for at least one of the communications. Then, the CP manager module may determine if the two or more communications may be transmitted at the present level of the power supply and using the theoretical power level adjustment. The two or more communications may be transmitted with the power level adjustment if the communications may be supported with the present level of the power supply and with the power level adjustment.

The CP manager module may access a table comprising power level adjustment values. The table may include power level adjustment values which are associated with communications according to the priority.

The CP manager module may also communicate with an electrical current ("EC") manager module. The CP manager module may send requests to the EC manager module to make adjustments to power levels of one or more resources which are controlled by the EC manager module.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2 is a graph which illustrates a plot of battery voltage below nominal versus time during a conventional DSDA scenario in the absence of any electrical current management;

FIG. 3 is another graph which illustrates a plot of battery voltage below nominal versus time during a conventional DSDA scenario in the absence of any electrical current management;

FIG. 4 is a graph which illustrates a plot of battery voltage below nominal versus time during a DSDA scenario with electrical current management;

FIG. 5 is a table that may be used by a communications power manager for managing DSDA scenarios;

DETAILED DESCRIPTION

Figure 1:
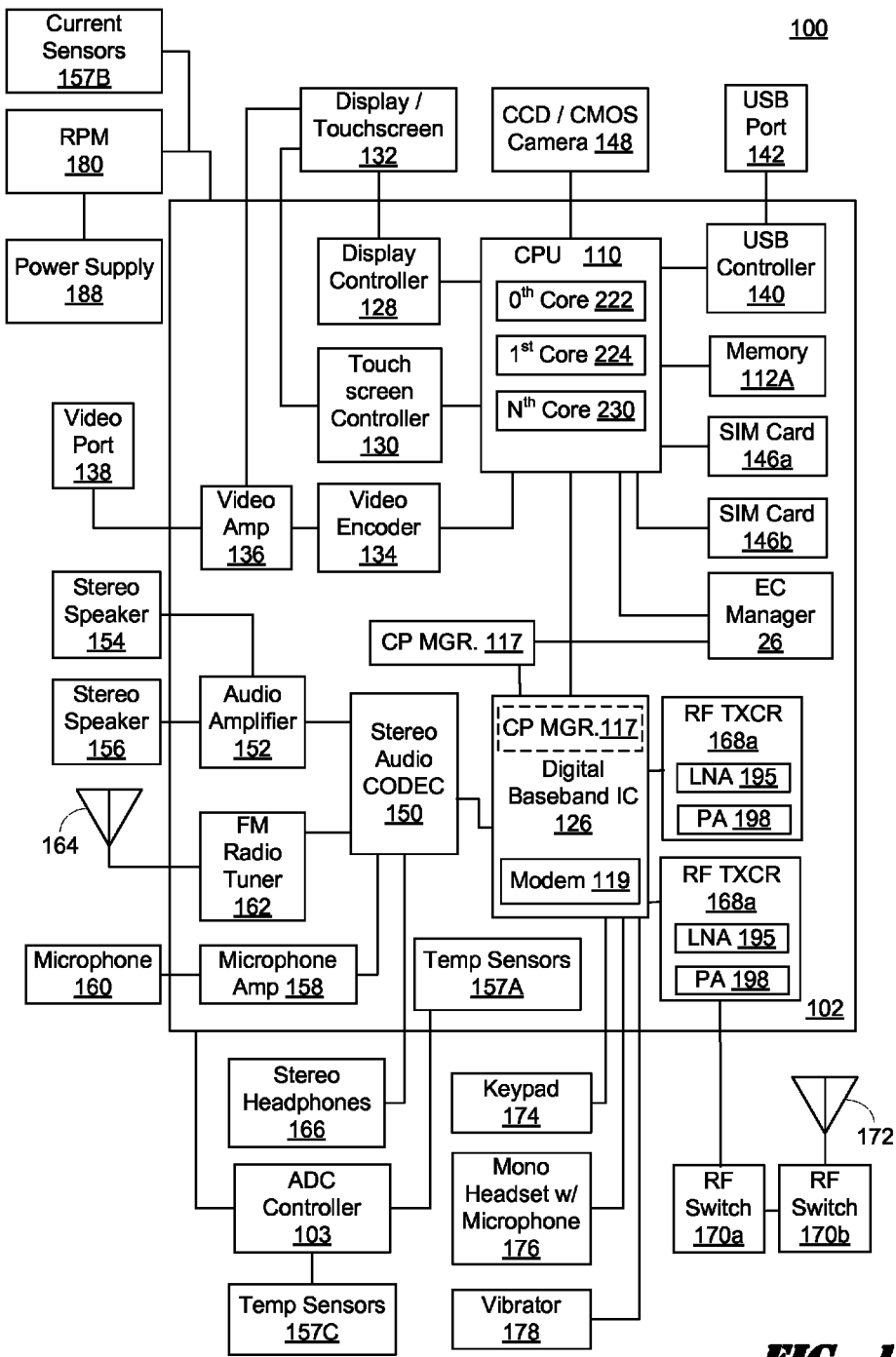
FIG. 1 is a functional block diagram of an exemplary, non-limiting aspect of a PCD in the form of a wireless telephone for implementing methods and systems for managing electrical current within a portable computing device.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the term "call" refers to a request for additional resources and/or functionality in a PCD over and above that which may be running at the time of the call. As such, one of ordinary skill in the art will understand that a call may be the result of a PCD user requesting the PCD to perform some function, provide some service, generate and render some deliverable or the like. Moreover, one of ordinary skill in the art will also understand that a call for a PCD resource may be the result of a given component within the PCD leveraging another component within the PCD to complete a workload task. As a non-limiting example, a user action to open a browser application on a PCD may cause calls for additional resources/components in the PCD not in use at the time of the call such as a modem, a graphical processor and/or a display. One of ordinary skill in the art will understand that allowing a call for a component or resource may increase battery demand within a PCD.

In this description, it will be understood that the terms "thermal" and "thermal energy" may be used in association with a device or component capable of generating or dissipating energy that may be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device.

In this description, the term "portable computing device" ("PCD") is used to describe any device operating on a limited capacity power supply, such as a battery and/or capacitor. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

An electrical current ("EC") manager module of a PCD, such as a mobile phone, may be embodied in software and/or hardware (or both). Similarly, a communications power ("CP") manager module may be embodied in software and/or hardware (or both).

The EC manager module may track the state of charge for the battery (power source) of the PCD while the CP manager module may communicate with the EC manager module to obtain this battery charge status information as well as managing power levels for inbound and outbound communications. The communications for a PCD may comprise voice calls or data or both. In some exemplary embodiments, the CP manager module may have a direct link to a battery and bypass the EC manager module to monitor battery status. In some exemplary embodiments, only the EC manager module is present within the PCD while in other exemplary embodiments, only the CP manager module is present within a PCD.

As understood by one of ordinary skill the art, a battery manifests different characteristics over time while the battery is discharging. Further, the impedance of a battery may change with temperature. The EC manager module and CP manager module may monitor the state of charge of the battery of the portable computing device as well as the impedance of the battery at a given instant so that it can compute the maximum electrical current that a battery may support. The EC manager module and/or CP manager module may determine the maximum electrical current "budget" that can be "spent" or used by a portable computing device. The EC manager module and/or CP manager module may also track conditions when the portable computing device and its battery are receiving energy from a charger.

The EC manager module may track the state of electrical current draw from all active hardware components of a portable computing device while the CP manager module may track the state of electrical current draw from all active hardware components responsible for communications for the PCD. In other exemplary embodiments, the EC manager module may assign "high" draw electrical current hardware components to a first group and assign "low" draw electrical current hardware components to a second group. According to this exemplary embodiment, the EC manager module may monitor each hardware component of the first group individually while it may assign an electrical current budget to the second group of hardware components and not track the individual electrical current draws of the hardware components in the second group. Stated differently, the EC manager module may allocate electrical current draw margins to the hardware components of the second group without tracking the individual states of each hardware component in this second group.

In other exemplary embodiments, the CP manager module may assign "high" draw electrical current communications to a first group and assign "low" draw electrical current communications to a second group. The CP manager module may adjust power levels of communication transmissions and communication receptions after calculating theoretical maximum electrical current "budgets" that can be "spent" for outbound and/or inbound communications. The CP manager module may send messages to the EC manager module to instruct the EC manager module to increase its "budget" to allow more power for communications while reducing power for other non-essential hardware and/or software operations.

In response to messages that it receives from the CP manager module, the EC manager module may set maximum electrical current draws for certain groups of hardware. The EC manager module may communicate one or more electrical current levels at which a particular hardware device may operate. The EC manager module may communicate a range of levels to a particular hardware device in which each level may be associated with predefined operations that may be specific to the hardware device.

For example, the EC manager module may communicate to a particular hardware device that it should switch from a high electrical current level of operation to a medium electrical current level of operation. The terms "high" and "medium" communicated by the EC manager module may be associated with specific operational characteristics of the hardware. In this scenario, the instruction of changing from a "high" level of operation to a "medium" level of operation from the EC manager module to an exemplary device, like a processor, may mean that the processor needs to dial back or lower its clock frequency.

The lowering of the clock frequency may effectively lower the electrical current draw of the processor. One of ordinary skill in the art recognizes that the messages communicated from the EC manager module to the hardware devices are not limited to the words low, medium or high. Other level designations may include numbers like level 1, level 2, or level 3, or alpha numeric codes, etc. The EC manager module may maintain a table that tracks predefined numerical levels, use cases, and predefined electrical current levels expressed in amperes.

Referring now to FIG. 1, this figure is a functional block diagram illustrating an exemplary embodiment of a portable computing device ("PCD") 100. An electrical current ("EC") manager module 26 as well as a communications power ("CP") manager module 117 within PCD 100 may leverage knowledge of individual hardware elements associated with various software and/or hardware applications in the PCD 100 to manage electrical current. Advantageously, by monitoring the specific electrical current of a hardware element or a plurality of hardware elements, the EC manager module 26 and/or CP manager module 117 may apply electrical current load management with a fine grained approach which, when necessary, prioritizes components and their associated functions in such a way that the operation of the PCD 100 is optimized.

As can be seen in the exemplary illustration of FIG. 1, a resource power manager ("RPM") 180 monitors and controls power supplied by a battery 188 for hardware elements residing within the integrated circuit ("IC") 102. One or more electrical current sensors 157B are configured to monitor power rails (not illustrated) and generate a signal indicative of electrical current consumption by the particular component(s) associated with power rails (not illustrated) which feed each of the hardware elements within IC 102. One or more electrical current sensors 157B may be positioned on the IC 102 and/or adjacent to the IC 102.

It is envisioned that the electrical current sensors 157B may be configured to monitor electrical current and be of a type such as, but not limited to, a Hall effect type for measuring the electromagnetic field generated by electrical current flowing through a power rail, a shunt resistor current measurement type for calculating electrical current from voltage drop measured across a resistor in the power rail, or any type known to one of ordinary skill in the art. As such, while the particular design, type or configuration of a electrical current sensor 157B that may be used in an embodiment of the systems and methods may be novel in, and of, itself, the systems and methods are not limited to any particular type of electrical current sensor 157B.

Other sensors, such as temperature sensors 157A and 157C may be configured for measuring temperature at or near a processing component, the measurement of which may also be used to deduce power consumption by a given component.

As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the EC manager module 26 and/or the CP manager module 117 may be responsible for monitoring electrical current within PCD 100, predicting impacts on battery loads and applying electrical current load management techniques to help the PCD 100 optimize its power supply and maintain a high level of functionality.

The EC manager module 26 communicates with multiple operational sensors (e.g., electrical current sensors 157B, temperature sensors 157A,C and hardware elements) distributed throughout the on-chip system 102 and with the CPU 110 of the PCD 100. In some exemplary embodiments, the EC manager module 26 may also monitor electrical current sensors 157B for current consumption rates uniquely associated with the cores 222, 224, 230 and transmit the current consumption data to a database (which may reside in memory 112). The EC manager module 26 may identify use case conditions of the PCD 100 that may warrant application of one or more electrical current load management techniques to specific hardware elements within chip 102.

As illustrated in FIG. 1, a display controller 128 and a touch screen controller 128 are coupled to the digital signal processor 110. A touch screen display 132 external to the on-chip system 102 is coupled to the display controller 128 and the touch screen controller 130. The EC manager module 26 may monitor workload queues for the cores 222, 224, 230, for example, and work with the RPM 180 to manage power provided to the cores from power supply 188. The EC manager module 26 may monitor electrical current measurements on power rails from the RPM 180 to components of the on-chip system 102 and calculate present levels of electrical draw on the power supply 188, that may comprise a single battery, a capacitor, and/or combination thereof, and/or an electrical charger for the battery. Advantageously, by quantifying present levels of electrical current loads the EC manager module 26 and/or CP manager module 117 may predict electrical current drawn on the battery 188 resulting from requests for additional functionality/workloads from one or more hardware elements within PCD 100.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112A and a pair of subscriber identity module ("SIM") cards 146a,b may also be coupled to the CPU 110. The two SIM cards 146a, b may support DSDA communications as further described herein and as understood by one of ordinary skill in the art. While only two SIM cards 146 are illustrated, one of ordinary skill in the art recognizes that more than two SIM cards 146 may be supported by the PCD 100. A graphical processing unit 182 may also be coupled to the CPU 110 for supporting graphics and program applications displayed on the touchscreen 132.

Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to a digital baseband integrated circuit ("IC") 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

The digital baseband IC 126 may comprise a modem 119 and another processor (not illustrated). The CP manager module 117 may be coupled to the modem 119. The CP manager 117 instead of being a separate hardware element relative to the IC 126 may be part of the IC 126 as understood by one of ordinary skill in the art and as indicated with the dashed lines within the IC 126. The digital baseband IC 126 may further comprise an analog-to-digital converter ("ADC"), a receive channel, a transmit channel, and a digital-to-analog converter ("DAC) as understood by one of ordinary skill in the art.

The receive channel (baseband receive hardware) and transmit channel of the digital baseband IC 126 may comprise a plurality of Wireless Communication System Modem Sub-Circuits ("WCSMSCs") as understood by one of ordinary skill in the art. These WCSMCs may form part of or all of the modem 119. Such exemplary WCSMCs are described in copending and commonly assigned U.S. patent application Ser. No. 12/396,270, filed on Mar. 2, 2009 (and published as U.S. Pat. App. Pub. No. 2009-0245192), the entire contents of which are hereby incorporated by reference.

Modem 119 may comprise a single hardware device. In alternate exemplary embodiments, two different modems 119 may be employed within the PCD 100. One of ordinary skill in the art recognizes that a single modem design typically conserves more electronic packaging space/area compared to the dual modem. The single modem design is usually more compact relative to the dual modem design.

The modem 119 may support global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE.

FIG. 1 further illustrates that a pair of radio frequency ("RF") transceivers 168a, b that may be coupled to the digital baseband IC 126. Each RF transceiver 168 may comprise a power amplifier ("PA") 198 for communication transmissions and a low noise amplifier ("LNA") 195 for communication receptions as understood by one of ordinary skill in the art. The PA 198 may be part of a transmit chain while the LNA 195 may be part of a transmit chain as understood by one of ordinary skill in the art. Exemplary transmit chains and receive chains of RF transceiver integrated circuits ("IC") are described in copending and commonly assigned U.S. patent application Ser. No. 12/396,270, filed on Mar. 2, 2009 (and published as U.S. Pat. App. Pub. No. 2009-0245192), the entire contents of which are hereby incorporated by reference.

Each RF transceiver 168 may operate at a unique frequency such that the pair of RF transceivers operate at different frequencies. The CP manager module 117 may be directly coupled to the PA 198 and LNA 195 such that it may adjust the power levels of each of these hardware elements as will be described in further detail below. These transceivers 168a, b may support DSDA communications as described above and in further detail below.

A pair of RF switches 170a,b may be coupled to the RF transceivers 168a, b and an RF antenna 172. As shown in FIG. 1, a keypad 174 may be coupled to the digital baseband IC 126. Also, a mono headset with a microphone 176 may be coupled to the digital baseband IC 126. Further, a vibrator device 178 may be coupled to the digital baseband IC 126. FIG. 1 also shows that a power supply 188, for example a battery, a capacitor, and/or a combination thereof, and/or an electrical charger in combination with the battery, is coupled to the on-chip system 102 through RPM 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits.

The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157C may be employed without departing from the scope of the invention. The thermal sensors 157A, 157C, in addition to being controlled and monitored by an ADC controller 103, may also be controlled and monitored by one or more EC manager module(s) 26.

The EC manager module 26 and/or CP manager module 117 may comprise hardware or software which is executed by the CPU 110. The EC manager module 26 and/or CP manager module 117 may comprise one or more modules. However, the EC manager module(s) 26 and/or CP manager module(s) 117 may also be formed from hardware and/or firmware without departing from the scope of this disclosure. The EC manager module(s) 26 may be responsible for monitoring and applying electrical current load policies that include one or more electrical current load management techniques that may help a PCD 100 avoid overburdening its power supply 188 while maintaining a high level of functionality and user experience. Meanwhile, the CP manager module 117 preferably comprises hardware for increased processing speed and for managing power levels of inbound and outbound communications relative to the RF transceivers 168.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the RPM 180 and the thermal sensors 157C are external to the on-chip system 102. However, it should be understood that the EC manager module 26 may also receive one or more indications or signals from one or more of these external devices by way of the baseband IC 126 and the CPU 110 to aid in the real time management of the resources operable on the PCD 100.

In a particular aspect, one or more of the method steps described herein may be implemented by executable instructions and parameters stored in the memory 112 that form the one or more EC manager module(s) 26 and/or the CP manager modules 117. These instructions that form the EC manager module(s) 26 and/or CP manager module 117 may be executed by the CPU 110, the baseband IC 126, or another processor, in addition to the ADC controller 103 to perform the methods described herein. Further, the processors 110, 126, the memory 112, the instructions stored therein, or a combination thereof may serve as a means for performing one or more of the method steps described herein.

FIG. 2 is a graph 200A which illustrates a plot of battery voltage below nominal versus time during a conventional Dual-Subscription, Dual-Active ("DSDA") scenario in the absence of any electrical current management. The X-axis may comprise units of time such as microseconds while the y-axis may comprise units of voltage corresponding to the battery 188. A first point 215 is part of a first curve 202A corresponding to a first communications burst such as a GSM cell phone transmission as understood by one of ordinary skill in the art. The value of the first point 215 on the y-axis may comprise negative (−) 0.5 volts while its value on the x-axis may comprise 610 microseconds (μs).

Meanwhile, a second point 205 may be part of a second curve 202B corresponding to a second communications burst such as a GSM cell phone transmission as understood by one of ordinary skill in the art. The value of the second point 215 on the y-axis may comprise negative (−) 0.5 volts while its value on the x-axis may comprise 605 microseconds (μs).

A third point 210 may be part of a third curve 202C (illustrated with a dashed line) corresponding to the sum or aggregate voltages that the two GSM communications bursts may have on the battery 188. The value of the third point 210 on the y-axis may comprise negative (−) 1.1 volts while its value on the X-axis may comprise 607 microseconds (μs). This drop of negative (−) 1.1 volts caused by the near simultaneous two GSM communications bursts during a DSDA scenario that is to be avoided or circumvented with the inventive system and method described below.

FIG. 3 is another graph 200B which illustrates a plot of battery voltage below nominal versus time during a conventional DSDA scenario in the absence of any electrical current management. FIG. 3 is similar to FIG. 2 so only the differences between these two figures will be described. A first point 220 is part of a first curve 202A corresponding to a first communications burst such as a GSM cell phone transmission as understood by one of ordinary skill in the art. The value of the first point 220 on the y-axis may comprise negative (−) 0.5 volts while its value on the x-axis may comprise 500 microseconds (μs).

Meanwhile, a second point 230 may be part of a second curve 202B corresponding to a second communications burst such as a GSM cell phone transmission as understood by one of ordinary skill in the art. The value of the second point 230 on the y-axis may comprise negative (−) 0.50 volts while its value on the x-axis may comprise 600 microseconds (μs).

Relative to the graph 200A of FIG. 2, the first curve 202A with the first point 220 of the graph of 200B is shifted in time, further to the left (earlier) in time by about 100 microseconds. This shift in timing for the first curve 202A of graph 200B relative to the first curve 202A of the graph 200A may increase the voltage drop (relative to graph 200A of FIG. 2) experienced by the battery 188 as will be shown by the third curve 202C described below.

The third point 225 may be part of the third curve 202C (illustrated with a dashed line) corresponding to the sum or aggregate voltages that the two GSM communications bursts may have on the battery 188. The value of the third point 225 on the y-axis may comprise negative (−) 1.3 volts while its value on the X-axis may comprise 550 microseconds (μs). This drop of negative (−) 1.3 volts caused by the near simultaneous two GSM communications bursts during a DSDA scenario that is to be avoided or circumvented with the inventive system and method described below.

FIG. 4 is a graph 200C which illustrates a plot of battery voltage below nominal versus time during a DSDA scenario with electrical current management. This graph 200C is similar to graphs 200A and 200B of FIGS. 2-3 so only the differences will be described. In this graph 200C, the first curve 202A corresponding to the first GSM communications burst is time shifted to the right relative to the second curve 202B by the CP manager module 117 so that the battery 188 does not experience an aggregate drop in voltage as described above. This time shift of the first curve 202A by the CP manger module 117 occurs after the CP manager module 117 performs calculations to determine if such a time shift will reduce or eliminate any of the substantial voltage drops, such as those illustrated in FIGS. 2-3 in a DSDA communications scenario. While a time shift for a communication is one option available to the CP manager module 117 to avoid the aggregate voltage drops illustrated in FIGS. 2-3, another option is to reduce power for one or both of the communications as will be described in further detail below.

FIG. 5 is a table 512 that may be used by a communications power manager 117 for managing DSDA scenarios. A PCD 100, such as mobile phone, may have DSDA scenarios such that it may support a GSM voice call in addition to an LTE data session. Two different radio technologies may be active where LTE may support voice communications while data is being transmitted using LTE. Two active communications may be occurring at the same time which are being supported by the single PCD 100, such as a mobile phone, having a single modem.

The CP manager module 117 may constantly review a status of the battery 188 of the PCD 100. Such status information may include state of charge as well as other battery characteristics. The CP manager module 117 may determine what the current state of sourcing capacity is for the battery 188.

Based on how much electrical current may be sourced/supported by the battery 188, if there are multiple communication sessions active such as in a DSDA type situation, the CP manager module 117 may determine how much margin exists within the battery 188 to support these two separate communication sessions at the same time.

If the battery 188 cannot support the two communication sessions at the same time, the CP manager module 117 may adjust the power for lower priority communications such that additional or the same power may be used for the higher priority communications. The CP manager module 117 may review the table 512 to determine the optimal selection of power for the two separate communication sessions. The CP manager module 117 may calculate the appropriate power levels to support the two separate communication sessions such that they remain within the headroom for remaining battery power.

If a single power level drop in a lower priority communication session does not allow the battery 188 to support both communication sessions, then the CP manager module 117 may calculate if a drop in transmission power for the higher priority session concurrently with a drop in the lower priority communication session will allow the battery 188 to support the two separate and simultaneous communication sessions.

In other words, the lower priority communication session may first be decremented and if both communications still cannot be supported by the battery 188 with that first decrease to the lower priority communication, then the CP manager module 117 may calculate if both communication sessions may be supported if the higher priority and the lower priority communication sessions are both decreased with respect to transmission power. The CP manager module 117 may determine if these decreases in transmission power will fit within the remaining power margins for the battery 188.

The CP manager module 117 makes the calculations governed by table 512 prior to any transmissions occurring in the modem 119. The CP manager module 117 may look or review frames of communications before they are actually transmitted by the modem 119.

The CP manager module 117 is usually designed to not drop any frames of communications. Instead, the CP manager module 117 may predict at what levels of power for transmission make the most sense for the remaining power left in the battery 188 at that future point of time when transmission of the frames of communication is to occur.

The CP manager module 117 may adjust the PA 198 for transmissions and the LNA 195 for receptions at appropriate levels in order to conserve energy within the battery 188 and to support the two or more separate and simultaneous communication sessions, such as in a DSDA scenario. In other exemplary embodiments, instead of adjusting levels of the PA 198 or LNA 195, such as in GSM communications or PDD/LTE communications which are time-based, the CP manager module 117 may be able to offset one communication session relative to the second communication session by a predetermined period of time so that both communication sessions may be supported, such as illustrated in FIG. 4 described above.

In other words, the CP manager module 117 may be able to interleave the two separate communication sessions by adjusting their timing so that transmissions of the first communication session and the second communication session occur in predetermined sequence relative to one another which lowers an aggregate voltage drop relative to the battery 188. In other scenarios, the CP manager module 117 may allow a GSM communication to occur at the same time as a WLAN communication, and if the WLAN has a lower priority, then the CP manager module 117 may have the WLAN communication transmitted at a time much later than the GSM communication.

The CP manager module 117 may also investigate or determine if transmitting at a different frequency could lower power consumption with respect to the battery 188. So the CP manager module 117 may consider frequency as well as timing as options to conserve power for the battery 188 and to insure that dual or multiple communications may be supported by the modem 119.

The CP manager module 117 may communicate with the EC manager 26 and send messages indicating that the CP manager module 117 needs more power for the modem traffic and therefore, the EC manager 26 needs to prioritize power consumption of other resources and to activate power conservation algorithms for lowering the power of these other power consuming resources, such as resources 105 illustrated in FIG. 8 which will be described below.

The CP manager module 117 may communicate such messages requesting additional power to the EC manager 26 in advance of the transmission of the modem traffic. The requests for additional power from the CP manager module 117 may occur such that the requisite power is present when the communications are being transmitted with the modem 119 via the RF switches 170.

The CP manager module 117 may receive an allocation from the EC manager 26 with respect to a power budget. Alternatively, the CP manager module 117 may set its own allocation and it may set the power budget and pass respective allocations to the EC manager 26 for the EC manager to distribute among its managed resources 105.

Referring again to FIG. 5, table 512 may be used by the CP manager module 117 after communications have been designated with a priority scheme. The CP manager 117 may create this priority scheme or another system element, such as the EC manager 26 may develop and apply the priority scheme.

An exemplary priority scheme includes, but is not limited to, voice communications receiving a higher priority relative to data communications which are assigned a lower priority. As mentioned above, when the CP manager module 117 determines that both sets of communications cannot be transmitted at the current power level based on the available power from the battery 188, CP manager module 117 may use table 512 to adjust transmission power levels so that both sets of dual or multiple communications may be transmitted with the present power available from the battery 188.

In table 512, the first column 517 may identify a particular communication use case and respective priority levels between a set of two different communications. For example, in the first row 545, the use case may include two separate voice communications in which a first voice communication (voice1) is set at a higher priority relative to a second voice communication (voice2) having a lower priority.

In the first row 545, second column 525, the step down in power is assigned a value of 1 dB. And the number of iterations that the communications manager 117 employs is at least two as set forth in the first row 545, third column 530 of table 512. The values in these two columns 525, 530 means that the communications manager 117 will determine if both voice communications may be transmitted if the lower priority voice communication is provided with a transmission power level that is 1 dB lower than its current assigned transmission power level.

If this calculation performed by the CP manager module 117 reflects that both voice communications cannot be supported, then as set forth in the first row 545, third column 530, the CP manager module 117 drops the transmission level again for a second time—for the lower priority voice communication by the amount set forth in the first row 545, second column 525 of table 512, which is 1 dB as noted above.

After this second iteration as governed by the first row 545, second column 530, if the CP manager module 117 determines that both voice communications may not be supported after this second drop (second iteration) in transmission power for the lower priority voice communication, then the power manager 117 then proceeds to the section of the table 512 (fourth and fifth columns 535, 540) for dropping the power levels for the higher priority voice communication.

In the exemplary embodiment of the table 512 illustrated in FIG. 5, the values for the fourth and fifth columns 535, 540 of the first row 545 are a 0.5 decibel drop with a single iteration for the higher priority voice communication. As understood by one of ordinary skill the art, the values of table 512 may be adjusted and customized for specific PCDs 100 which utilize various types of batteries 188, modems 119, power amplifiers 198, and low noise amplifiers 195 for communications.

Continuing with the example described above relative to the dual voice DSDA use case addressed by the first row 545 of table 512, after it is determined by the CP manager module 117 that the two drops in power levels at 1 dB each (as dictated by the first row 545, second and third columns 525, 530 of table A1), the communications power manager 117 may proceed to the fourth and fifth columns 535, 540 to calculate that if the higher priority voice communication is provided with a 0.5 decibel drop in transmission power, then can the modem 119 may be able support both voice communications simultaneously.

If the answer to this inquiry is negative, then the CP manager module 117 may return back to the first row 545, second column 525 for addressing the lower priority voice communication again. The CP manager module 117 may continue cycling through row 545 until appropriate transmission power levels are calculated which will support the dual transmission of the voice communications.

With respect to the second row 550 of table 512 which addresses communications comprising voice transmissions and data transmissions, the drops in transmission power for data transmissions designated with a lower priority may have a higher magnitude relative to drops in power levels for lower priority voice communications. For example, as illustrated in the first row 545, second column 525, the low priority level voice transmissions have a value of 1 dB for drops in power compared to the value of 2 dB in the second row 550, first column 525 for the lower priority data transmissions.

The range for drops in power for each use scenario/communication type may generally comprise between about 0.1 dB to about 5.0 dB. However, other values above or below these endpoints may be possible and feasible as understood by one of ordinary skill in the art. Further, the number of iterations for each drop in a transmission power level may be varied and customized for a particular PCD 100 as understood by one of ordinary skill in the art. Also, while a two-level priority scheme has been discussed and illustrated (high vs. low), other priority schemes which have multiple levels (more than two) are within the scope of this disclosure as understood by one of ordinary skill in the art.

The CP manager module 117 may perform these calculations in table 512 on a communication timing slot by communications timing slot basis or at other predetermined timing levels which may be less frequent than a timing slot by timing slot communications determination. After cycling through a single iteration of any row within table 512, the CP manager module 117 may also send a message to the EC manager 26 to request the EC manager 26 to activate one or more power conservation measures in order to provide more of a power budget to the CP manager module 117 so that it may support both of its (or multiple—more than two) communications.

The CP manager module 117 may receive data about the present battery levels from the EC manager 26. In other exemplary embodiments, the CP manager module 117 may directly monitor present battery levels with a direct coupling to the battery 188.

Figure 6:
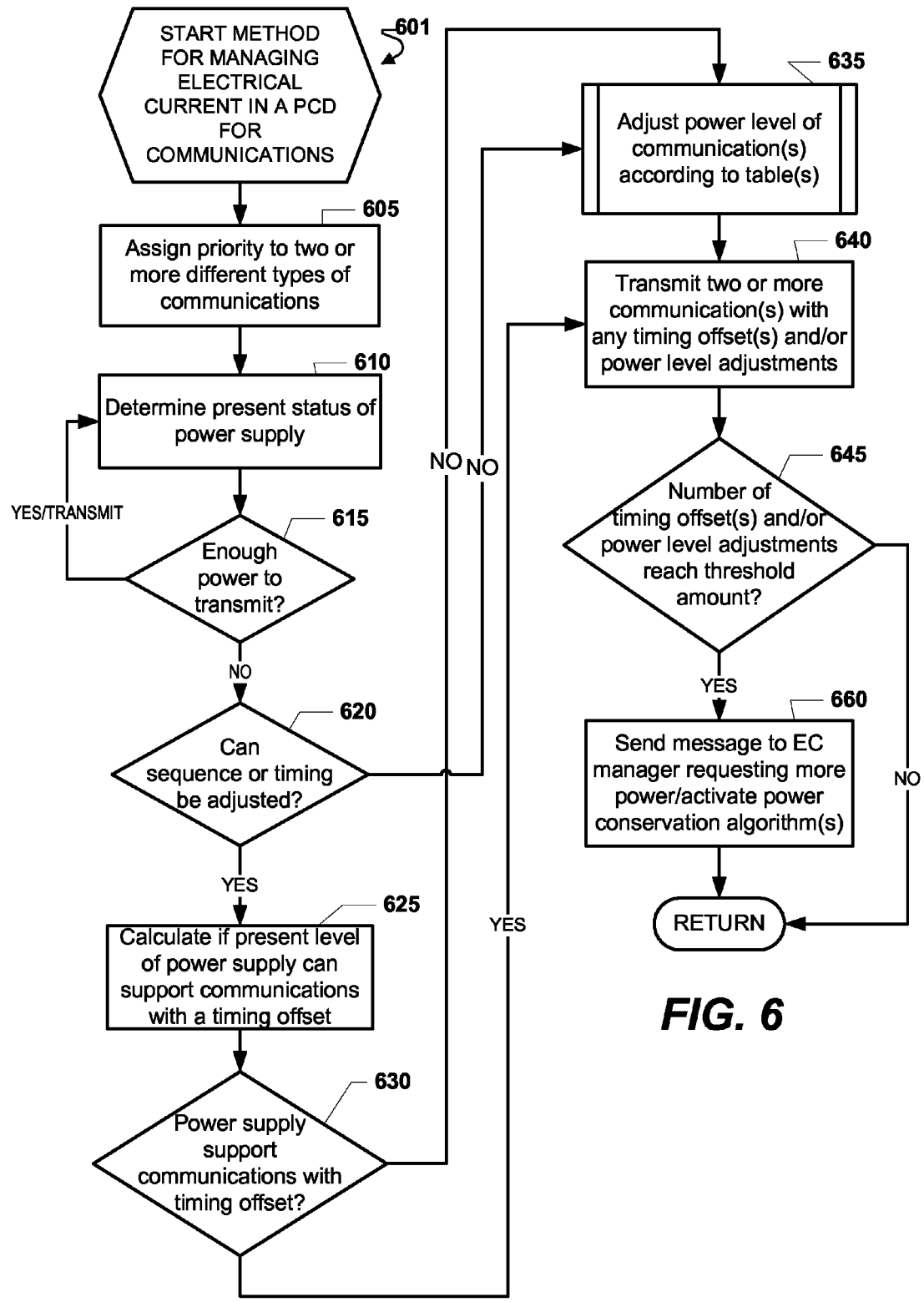
FIG. 6 is logical flowchart illustrating a method for managing electrical current levels for communications in a portable computing device.

FIG. 6 is logical flowchart illustrating a method 601 for managing electrical current levels of communications in a portable computing device 100. Block 605 is the first step in the method 601. In block 605, the CP manager module 117 may assign priority to two or more different types of communications. For example, the CP manager module 117 may assign voice communications with a higher priority relative to data communications which are assigned a lower priority. Similarly, a first type of voice communication may be assigned a higher priority over a second type of voice communication. For example, the CP manager module 117 may assign voice communications originating from a first SIM card 146*a* a higher priority relative to second voice communications originating from a second SIM card 146*b*. The number and types of priorities are not limited to the examples described herein and may include any number and types as understood by one of ordinary skill in the art.

Next, in block 610, the CP manager module 117 may determine the present status of the power source 188 which may comprise a battery. In this step, the CP manager module 117 may directly monitor power levels from the power source 188 with a direct coupling/connection. Alternatively, the CP manager module 117 may request status of the present power level for the power source 188 from the EC manager 26.

In decision block 615, the CP manager module 117 may determine if two or more simultaneous communications may be transmitted at the present power levels being monitored. If the inquiry to decision block 615 is positive, then the "YES" branch is followed back to block 610 in which the CP manager module 117 continues to monitor the present status of the power source 188.

If the inquiry to decision block 615 is negative, then the "NO" branch is followed to decision block 620. In decision block 620, the CP manager module 117 may determine if a sequence or timing of the simultaneous communications may be adjusted. If the inquiry to decision block 620 is negative, then the "NO" branch is followed to routine block 635.

If the inquiry to decision block 620 is positive, then the "YES" branch is followed to block 625. In block 625, the CP manager module 117 may calculate if the present battery power level may support two or more communications with a predetermined timing offset. This predetermined timing offset may be calculated by the CP manager module 117.

After calculating the timing offset in block 625, the CP manager module 117 in decision block 630 may determine if the present battery power level may support the two more communications being adjusted by the predetermined timing offset. If the inquiry to decision block 630 is negative, then the "NO" branch is followed to routine block 635.

If the inquiry to decision block 630 is positive, then the "YES" branch is followed to block 640 in which the two or more simultaneous communications are transmitted with any calculated timing offsets and/or power level adjustments.

In routine block 635, the CP manager module 117 may just be power level of one or more communications according to a table for managing communications based on the priority assigned in block 605. Further details of routine 635 will be described below in connection with FIG. 7. After routine block 635, block 640 may be executed in which the two or more communications are transmitted with any calculated timing offsets and/or power level adjustments.

After block 640, in decision block 645, the CP manager module 117 may determine if the number of timing offsets and/or the number of power level adjustments has reached a predetermined threshold. In other words, the CP manager module 117 may track the total number of times it may need to adjust power levels and/or timing of communications. A threshold may be assigned or selected so that the CP manager module 117 may transmit messages to the EC manager 26 in order to provide more power to be allocated for communications so that fewer changes—as made in blocks 630-640—are needed to support the two or more communications.

If the inquiry to decision block 645 is positive, then the "YES" branch is followed block 660. If the inquiry to decision block 645 is negative, then the "NO" branch is followed to the return block in which the process returns back to block 605.

In block 660, the CP manager module 117 may send one or more messages to the EC manager 26 which request more power to be allocated for communications and/or request that the EC manager 26 activate one or more power conservation algorithms for reducing power among resources 105 managed by the EC manager 26. The process then returns back to block 605.

According to an alternate exemplary embodiment, blocks 620 and 635 may be reversed. For example, the CP manager module may first adjust power levels to two or more communications before the CP manager module 117 attempts or determines if a sequence or timing of communications can be adjusted in block 620.

Figure 7:
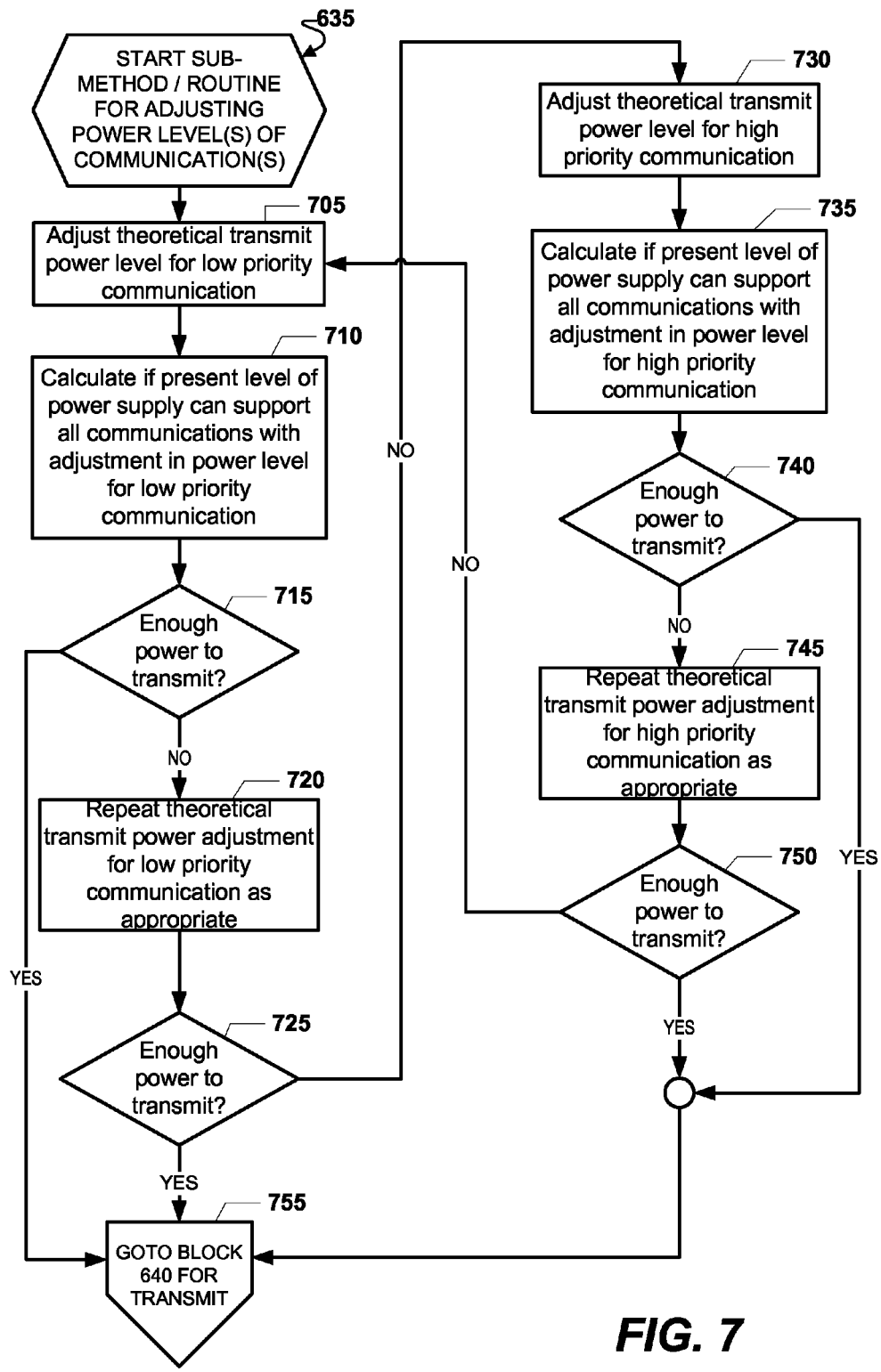
FIG. 7 is logical flowchart illustrating a sub-method or routine of FIG. 8 for managing electrical current levels for communications in a portable computing device.
Figure 8:
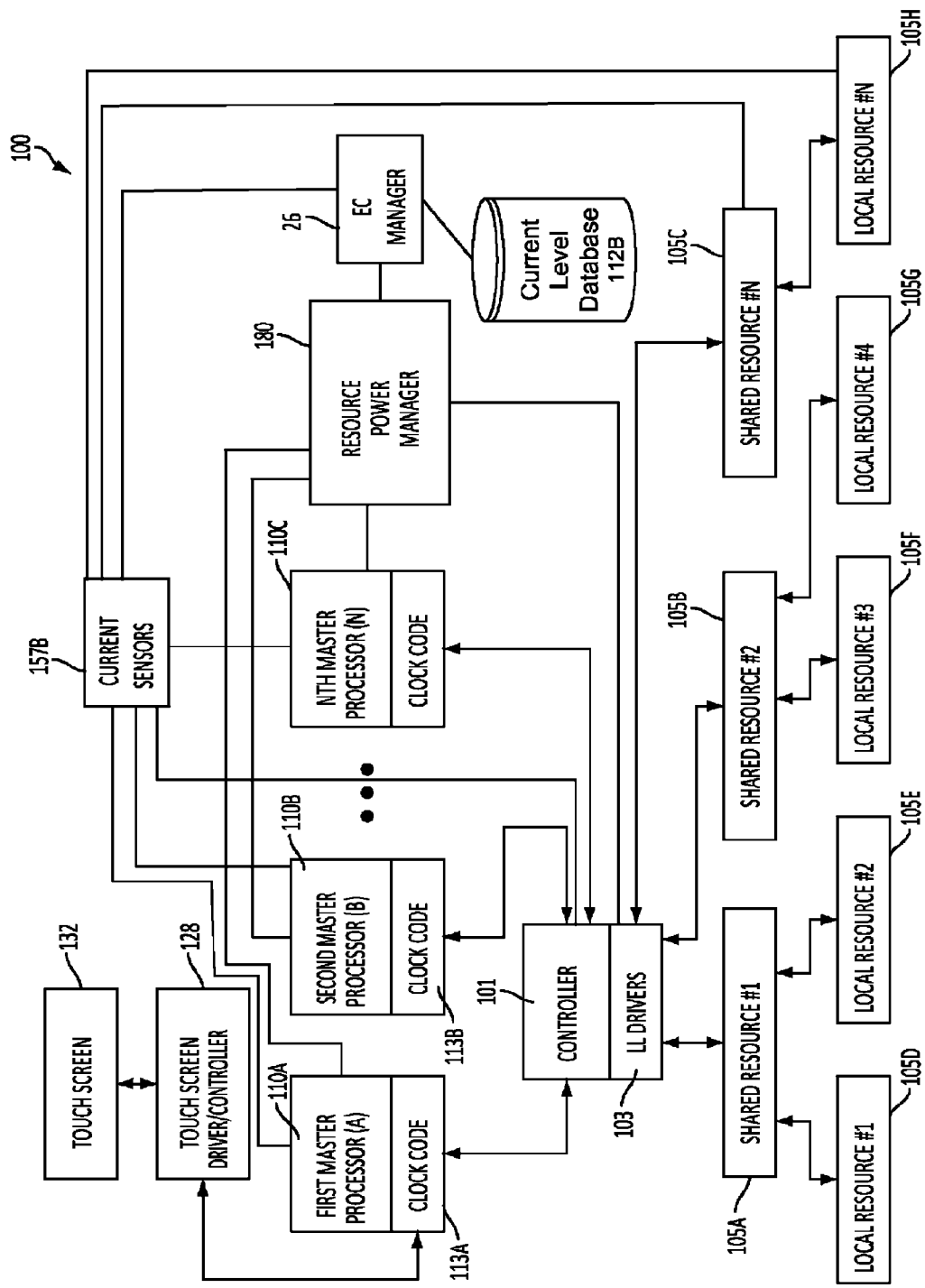
FIG. 8 is a functional block diagram illustrating relationships among the EC manager, controller, a resource power manager, master processors, low-level drivers, shared resources, and local resources.

FIG. 7 is logical flowchart illustrating a sub-method or routine 635 of FIG. 8 for managing electrical current levels for communications in a portable computing device 100. Routine 635 corresponds to the same numbered routine in FIG. 7 described above. Block 705 is the first step of routine 635 in which the CP manager module 117 may adjust a theoretical power level of a low priority communication based on a first entry in a table such as table 512 illustrated in FIG. 5 described above. In a DSDA scenario in which the communications both comprise voice traffic, then block 705 may correspond with the first row 545, first column 525 in which the CP manager module 117 may adjust a theoretical power level of the low priority communication.

Next, in block 710 the CP manager module 117 may calculate if the present power level of the power source 188 may support the two or more communications with the theoretical power adjustment made in block 705. In decision block 715, based on the calculation of block 710, the CP manager module 117 may determine if the present power level of the power source 188 may support the two more communications with the theoretical adjustment to the low priority communication.

If the inquiry to decision block 715 is positive, then the "YES" branch is followed to block 755 in which the sub-method returns to block 640 of FIG. 6 where the two or more communications are transmitted with the calculated offsets and/or calculated power level adjustments. If the inquiry to decision block 715 is negative, then the "NO" branch is followed to block 720.

In block 720, the theoretical adjustment for the low priority communication may be repeated if appropriate and as designated in the table 512. Block 720 corresponds to the number of iterations listed in the third column 530 of the table 512 of FIG. 5. One of ordinary skill in the art recognizes that block 720 is dependent on the number of iterations present in the third column 530 of table 512 in FIG. 5. This means that block 720 may be skipped or omitted if the number of iterations is one in the iteration column.

Decision block 725 is similar to decision block 715 in which the CP manager module 117 may determine if the present power level of the power source 188 may support the two or more communications with the theoretical adjustment and power to the low priority communication. If the inquiry to decision block 725 is positive, then the "YES" branch is followed to block 755 in which the sub-method returns back to block 640 of FIG. 6 where the communications are transmitted based on the calculations of FIG. 7.

If the inquiry to decision block 725 is negative, then the "NO" branch is followed to block 730. In block 730, the CP manager module 117 may adjust a theoretical power level of the high-priority communications. Block 730 generally corresponds with the fourth column 535 and fifth column 540 of table 512. One of ordinary skill in the art recognizes that the magnitudes for the drops in power levels in table 512 are merely exemplary and that other values higher or lower may be provided for a particular PCD 100.

Next, in block 735, the CP manager module 117 may calculate if the present power level of the power source may support the two or more communications with the theoretical adjustments in power to the high-priority communications. Next in decision block 740, the CP manager module 117 may determine if the present power levels of the battery source 188 may support the two or more communications with the theoretical adjustment and power to the high-priority communications.

If the inquiry to decision block 740 is positive, then the "YES" branch may be followed to block 755 in which the sub-method returns to block 640 of FIG. 6 in which the two or more communications are transmitted according to the power adjustment to the higher priority communication. If the inquiry to decision block 740 is negative, then the "NO" branch is followed to block 745.

In block 745, similar to block 720 described above, the CP manager module 117 may repeat the theoretical power adjustment for the high-priority communication as appropriate. In other words, block 745 corresponds with the number of iterations called out or listed in the fifth column 540 of table 512. This means that block 745 may be skipped or omitted if the number of iterations is one in the iteration column.

Next in decision block 750, similar to block 710, the CP manager module 117 may calculate if the present power level of the power source may support the two or more communications with the theoretical adjustments in power to the high-priority communications.

If the inquiry to decision block 750 is positive, then the "YES" branch is followed to block 755 in which the sub-method returns to block 640 of FIG. 6 where the two or more communications are transmitted by the PCD 100. If the inquiry to decision block 755 is negative, then the "NO" branch may be followed back to block 705 in which the theoretical power level of the low priority communications is again adjusted.

Figure 14:
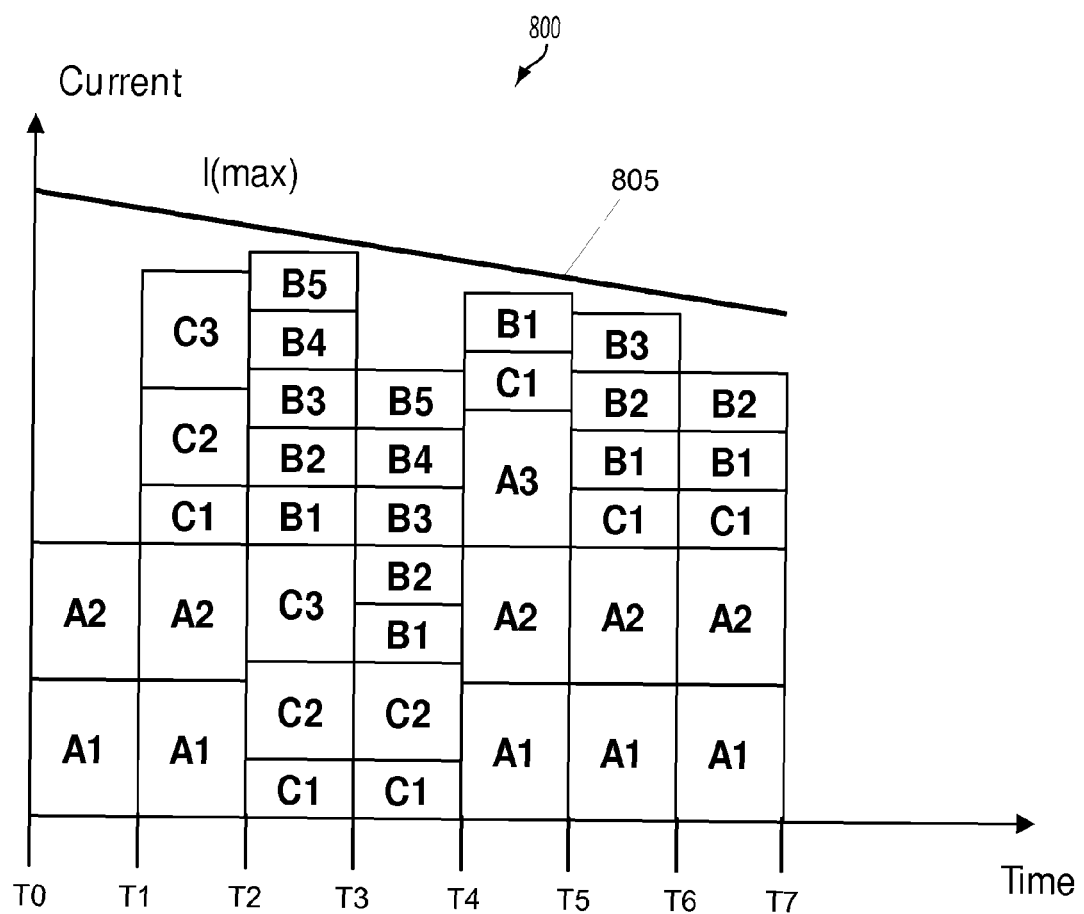
FIG. 14 is a graph 800 which illustrates instantaneous current plotted on the y-axis versus time on the x-axis in addition to present consumption of categories of electrical consumers illustrated in FIG. 13.

FIG. 8 is a functional block diagram illustrating relationships among a controller 101, resource power manager 180, master processors 110, low-level drivers 103, shared resources 105A-C, and local resources 105D-H that are part of a PCD 100. FIG. 14 also illustrates how the touchscreen 132 may be coupled to the touchscreen driver/controller 128. The touchscreen driver/controller 128 may be coupled to clock code 113A of a first master processor 110A.

In the exemplary embodiment shown in FIG. 8, the first master processor 110A may be coupled to the resource power manager ("RPM") 180 and the controller 101. The RPM 180 may be responsible for controlling power to the hardware elements such as processors 110A-110C. The RPM 180 may also control power to each resource 105 through its control of low level drivers 103. The RPM 180 may execute or run the EC manager module 26 when it is embodied as software. Alternatively, the RPM 180 may comprise the EC manager module 26 when it is embodied as hardware and/or software or both.

The EC manager module 26 manages and maintains a database 112B. Exemplary data stored in the database may include, but is not limited to, a table that tracks predefined numerical levels, use cases, and predefined electrical current levels expressed in amperes as will be described in further detail below in connection with FIG. 11. With the database 112B, the EC manager module 26 may monitor and track instantaneous electrical current levels of the battery 188 and/or any chargers used to replenish the battery 188 with various current sensors 157B. The EC manager module 26 may issue commands through the RPM 180 to control current levels of the various hardware elements illustrated such as the processors 110 and resources 105 as will be described in further detail below.

The controller 101 may be coupled to the clock code 113A of the first master processor 110A. The controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports or aids tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 128. The touchscreen driver/controller 128 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state.

Figure 9:
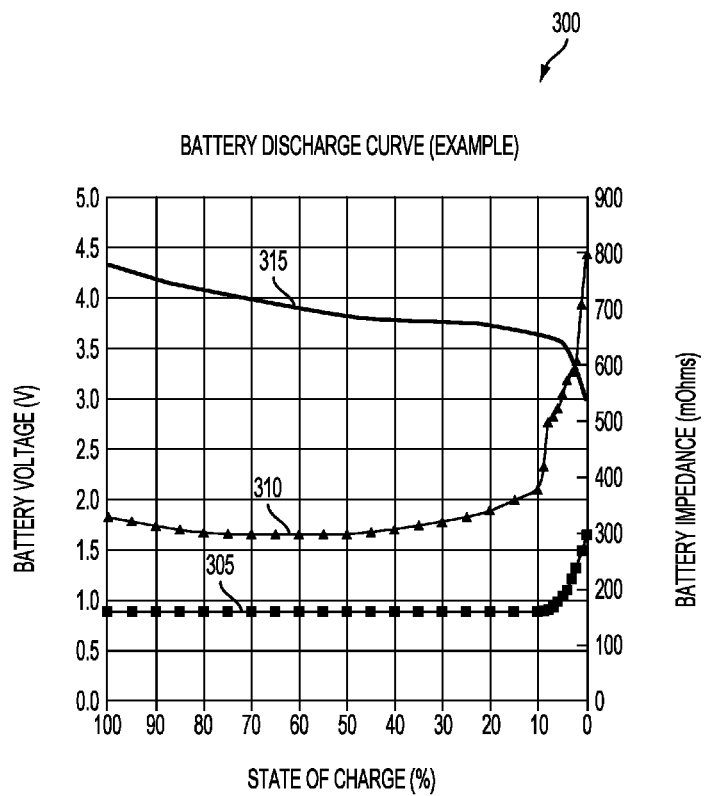
FIG. 9 is a graph which illustrates the state of charge of a battery of a portable computing device plotted along the X-axis versus battery voltage (in Volts) plotted a long a first y-axis and battery impedance (milliohms) plotted along a second y-axis.

FIG. 9 is a graph 300 which illustrates the state of charge of a battery 188 of a portable computing device 100 plotted along the X-axis versus battery voltage (in Volts) plotted a long a first y-axis and battery impedance (milliohms) plotted along a second y-axis. The first curve 305 of graph 300 tracks the state of charge of a battery 188 of a portable computing device 100 operating at 25° C.

Meanwhile, the second curve 310 of graph 300 corresponds with the same battery 188 of the portable computing device operating at 0° C. The second curve 310 illustrates how battery impedance increases with decreases in temperature. The third curve 315 tracks the open circuit voltage of the Battery 188. By tracking the temperature of a portable computing device 100, the EC manager module 26 will be able to accurately calculate the instantaneous electrical current available from the battery 188 since the impedance of the battery 188 is a function of temperature. The EC manager module 26 may store the information contained in graph 300 in its database 112B.

Figure 10:
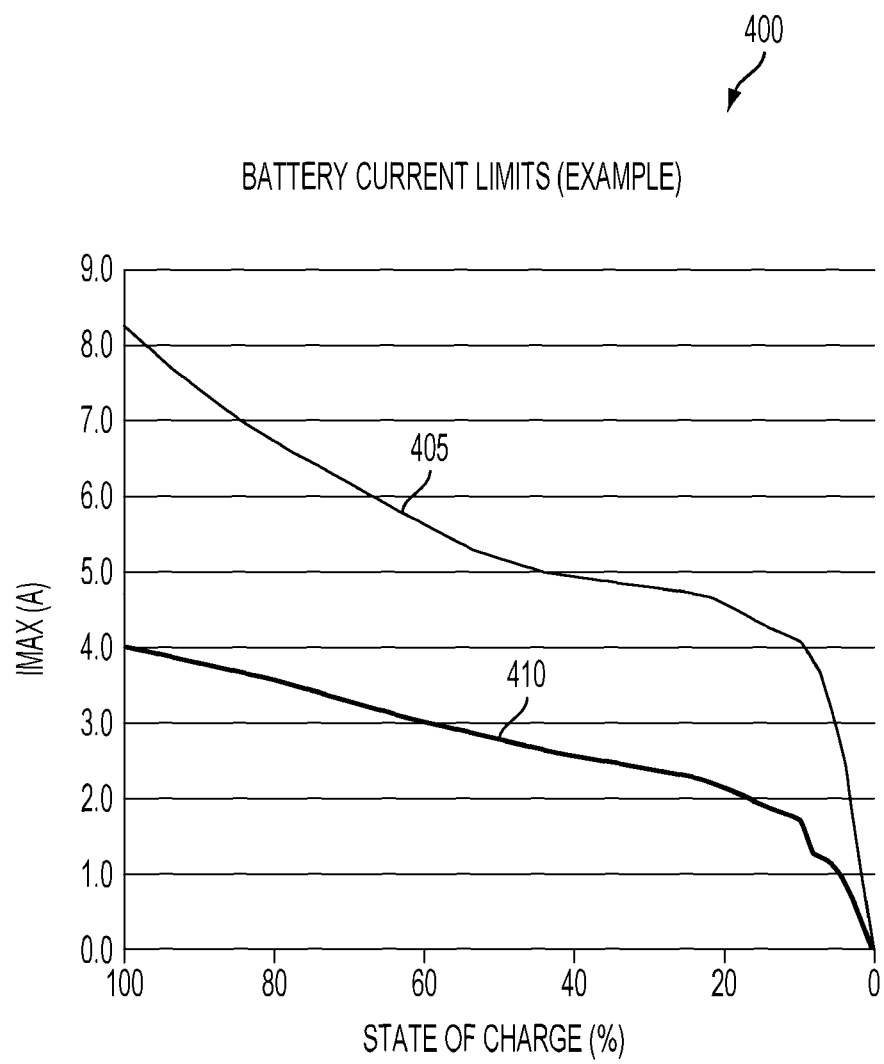
FIG. 10 is a graph which illustrates the state of charge of a battery of a portable computing device projected along the X-axis against achievable current maximums projected on the Y-axis.

FIG. 10 is a graph 400 which illustrates the state of charge of a battery 188 of a portable computing device 100 projected along the X-axis against achievable current maximums projected on the Y-axis. As understood by one of ordinary skill the art, the impedance of a battery 188 may change in response to changes in temperature as discussed above in connection with FIG. 15.

The first curve 405 of graph 400 tracks electrical current associated with a battery 188 operating at a first temperature while the second curve 410 tracks electrical current associated with the same battery 188 operating at a second temperature. In the exemplary embodiment illustrated in FIG. 10, the first temperature comprises 25° C. while the second temperature comprises 0° C.

At higher temperatures, a battery 188 may support more current as indicated by the first curve 405. Meanwhile, at lower temperatures, the impedance for the same battery 188 increases, which means that the same battery 188 will support less current as indicated by the second curve 410. This information about the electrical current supported by the battery 188 may be monitored and tracked by the EC manager module 26 with its database 112B as will be described in further detail below in connection with FIGS. 5-6.

Figure 11:
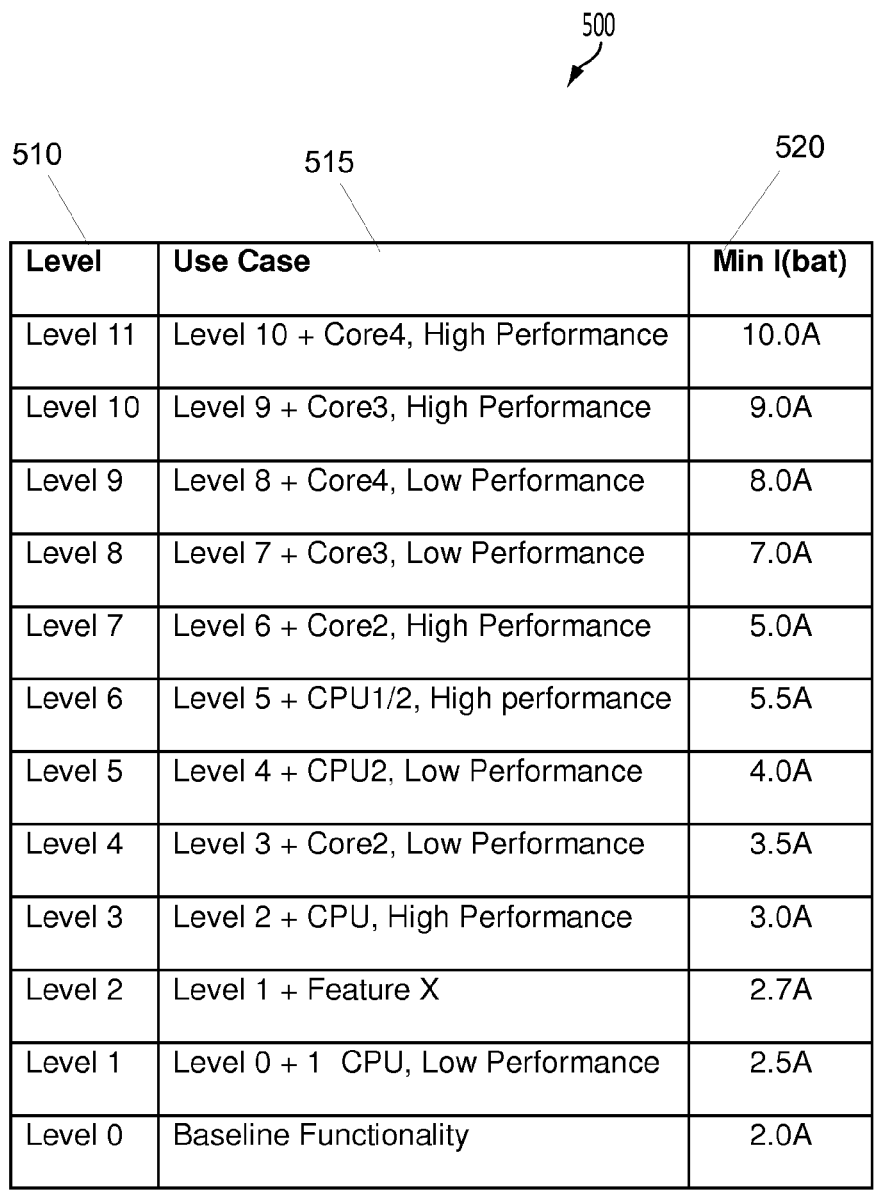
FIG. 11 provides a PCD current level tracking table that may be part of a database maintained by the EC manager module.

FIG. 11 provides a PCD current level tracking table 500 that may be part of a database 112B maintained by the EC manager module 26. The table 500 may comprise predefined numerical levels 510 listed in a first column, PCD use cases 515 in the second column, and predefined electrical current levels 520 expressed in Amperes in the third column. However, one of ordinary skill the art recognizes that other data as well as different order or sequences of the data tracked in table 500 may be employed without departing from the scope of the disclosure described herein.

Each numerical level 510 in the table 500 may be associated with a particular PCD use case 515 that relates to functions, features, and/or operations of specific hardware elements within the portable computing device 100. For example, level 0 (zero) may be associated with a baseline functionality. Meanwhile, level 1 may include the functionality of level 0 in addition to a CPU operating at a "low performance." Level 2 may include the functions/features/operations of level 1 in addition to a Feature X, where X may be specified by the operator of the PCD 100 and/or manufacturer of the PCD 100.

The minimum current level 520 assigned to each use case 515A for levels 0, 1, and 2 are 2.0 amps, 2.5 amps, and 2.7 amps respectively. And so-on. The minimum current level 520 for each row/level 510 of table 500 may be determined by the EC manager 26, the manufacturer of the PCD 100, and/or the operator of the PCD 100.

The EC manager module 26 may determine the instant current maximum for the portable computing device 100 and then communicate operational level messages to its various hardware devices under its control. For example, at the level 1 row of table 500 the EC manager module 26 may communicate to a multicore processor 110 that it may operate one of its cores, like zero core 222 of FIG. 1, at a low level which translates to the non-turbo mode expressed in table 510.

The EC manager module 26 may easily produce the data listed in table 510 and/or the data may be calculated under laboratory conditions and then loaded into memory 112A of the portable computing device 100 so that the EC manager module 26 may access the table 510 with this pre-loaded data. Whether or not the EC manager module 26 may produce the data listed in table 510 depends on the amount and the location of current sensors 157B provided within the portable computing device 100. In some instances, too many electrical current sensors 157B may be cost prohibitive as understood by one of ordinary skill in the art. If electrical current sensors 157B are provided, the EC manager module 26 may communicate to receive data from the sensors 157B.

Figure 12:
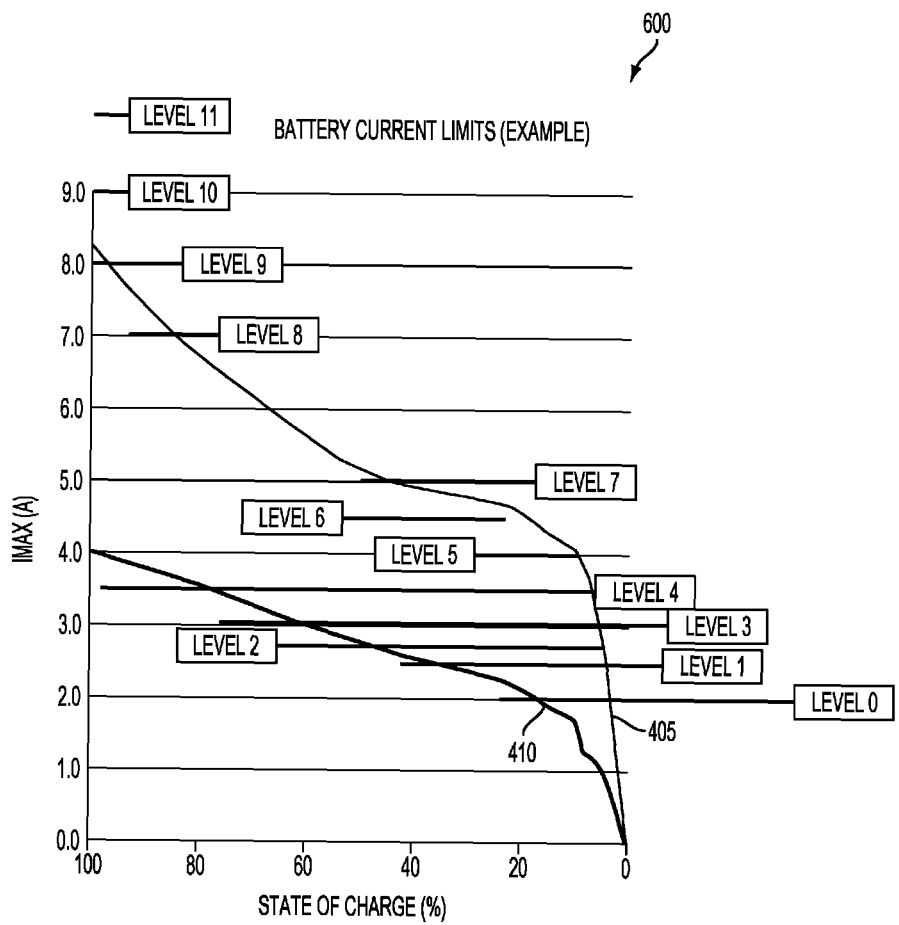
FIG. 12 is a graph which illustrates the state of charge of a battery of a portable computing device projected along the X-axis against achievable current maximums projected on the Y-axis along with electrical current levels referenced in the table of FIG. 11.

FIG. 12 is a graph 600 which illustrates the state of charge of a battery 188 of a portable computing device projected along the X-axis against achievable current maximums projected on the Y-axis. The graph 600 of FIG. 12 also comprises the electrical current levels referenced in table 500 of FIG. 11.

Graph 600 is very similar to graph 400 in that it also contains the first curve 405 which tracks data associated with the battery 188 operating at a first temperature. Graph 400 also has the second curve 410 of FIG. 10 which tracks data associated with the same battery 188 operating at a second temperature. In the exemplary embodiment illustrated in FIG. 12, the first temperature comprises 25° C. while the second temperature comprises 0° C.

The graph 600 illustrates how the highest level for a battery 188 operating at the second temperature of 0° C. tracked by the second curve may only reach level 4. This level 4 of graph 600 corresponds with level 4 of table 500 and FIG. 11.

The EC manager module 26 computes instantaneous electrical current using ohms law which is embodied in equation 1 (EQ1) provided below:

$$I(max)=(Ocv-Vmin)/Rbat \quad\quad (EQ1)$$

wherein I(max) is the instantaneous maximum electrical current; Ocv is the open circuit voltage of the battery 188, which is a function of the state of charge ("SoC") of the battery 188; Vmin is the minimum voltage of the battery 188 needed to support operation of the PCD 100 (i.e., if the battery voltage drops below this level, a voltage regulator on the PCD power grid may begin to operate outside of specification leading to a reset of the PCD 100); and Rbat is the impedance of the battery 188.

The EC manager module 26 computes what maximum current (Imax) may be supported by the portable computing device 100 based on the characteristics of the battery 188. Most battery manufacturers will provide some characteristics about the battery 188 and how they may change across operating states, like how impedance of the battery 188 may change over time due to various factors such as temperature. This information may be used by the EC manager module 26 to calculate the state of charge at a particular instant in time for the portable computing device 100.

From the state of charge (Soc) parameter, the EC manager module 26 may calculate the open voltage (Ocv) which can be supported by the battery 188. Also from the state of charge and the battery characteristics, the maximum current (Imax) that may be supported at any given instant of time may be calculated by the EC manager module 26. Based on the calculated electrical current maximum (Imax), the EC manager module 26 may issue commands to throttle hardware elements accordingly.

Referring back to table 500 FIG. 11, the EC manager module 26 is calculating the present electrical current maximum (Imax) and comparing its calculated Imax value to the minimum current level listed in column 520 of table 500 (which levels are also plotted in graph 600 of FIG. 12). Based on the user scenarios listed for a particular level, the EC manager module 26 will activate and/or deactivate hardware elements corresponding to the user scenarios listed in table 500 for a particular operating level.

As noted previously, the EC manager module 26 may reside or be executed by the resource power manager (RPM) 180 as illustrated in FIG. 14. The RPM 180 is typically embodied by an ARM processor as understood by one of ordinary skill in the art. If not residing in an ARM, the EC manager module 26 may reside within or be executed by a processor 110 which does not usually enter into a sleep state. However, according to other exemplary embodiments, it is possible that the EC manager module may be executed by an ordinary central processing unit 110 or an applications processor 110 that on occasion may enter into a sleep state, but such embodiments would likely be less preferred.

Figure 13:
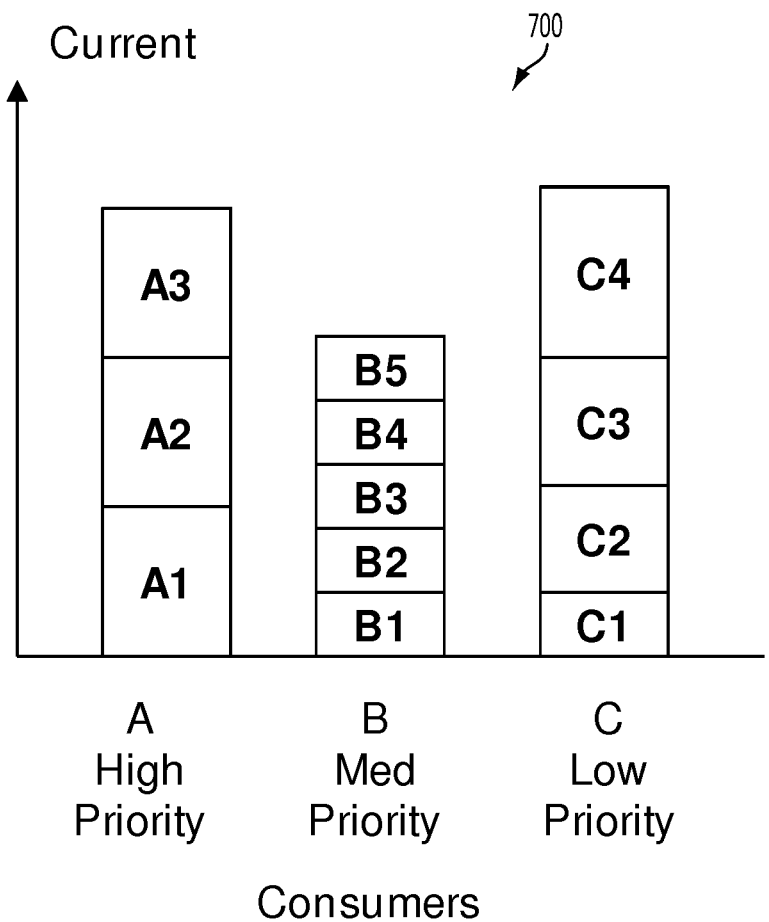
FIG. 13 is a bar chart 700 that illustrates at least three different types of electrical consumers that may be categorized within a portable computing device by the EC manager module.

Referring now to FIG. 13, this figure comprises a bar chart 700 that illustrates at least three different types of electrical consumers that may be categorized within a portable computing device 100 by the EC manager module 26. A first set of electrical consumers may be designated with a high priority such as those designated with the letter "A" as illustrated in FIG. 13.

A second set of electrical consumers may be designated with a medium priority such as with the letter "B." A third set of electrical consumers may be designated with a low priority such as with the letter "C."

Each priority may be assigned a particular weighting which may be represented mathematically. Further, one of ordinary skill in the art recognizes that the number of sets or categories of electrical consumers within a portable computing device 100 may be increased or decreased without departing from the scope of the disclosure described herein.

The functions/features/operations assigned to a particular set or category may be adjusted depending upon desired priorities by the operator of the portable computing device 100. For example, an operator of the portable computing device 100 who is primarily interested in recording video and less interested in gaming may assign video recording with a higher priority relative to gaming, which may be assigned a lower priority as understood by one of ordinary skill in the art.

According to one exemplary embodiment, the level "A" type of electrical consumers may correspond to different levels for supporting voice calls in a portable computing device 100. The lowest level (A1) within this type of electrical consumer may comprise supporting voice calls in an emergency 911 ("E911") situation. The highest level within this set or class of priority may comprise level A3 in which voice and data may be transmitted simultaneously.

Meanwhile, at the next level within category "A" hardware elements, such as the level A2, only voice calls may be supported and not data as understood by one of ordinary skill in the art. And as noted above, the A1 level may only be limited to E911 type calls.

The medium priority functions and/or features assigned to the letter "B" category may comprise video gaming in which performance may be adjusted without degrading perceivable quality of service ("QoS") by the user. For example, response time, updates, and how things are encoded may be may be reduced without any perceivable degradations in QoS.

The lowest priority functions and/or features assigned to the letter "C" category may comprise operations such as a camcorder. Performance of the camcorder may be adjusted such that the number of frames per second may be reduced during recording in order to conserve electrical current.

Referring now to FIG. 14, this figure has a graph 800 which illustrates instantaneous current plotted on the y-axis versus time on the x-axis in addition to present consumption of categories of electrical consumers illustrated in FIG. 13. Graph 800 illustrates how electrical current within a portable computing device 100 is consumed over time.

Between time 0 in time T1, an operator of the portable computing device 100 may power up the device and initiate a voice phone call as indicated by current levels A1 plus A2. The electrical current levels represented by A1 plus A2 fall well below the instantaneous current maximum tracked by curve 805 of FIG. 14.

Next, between times T1 and T2, the voice call as represented by electrical current levels A1 plus A2 may continue while current levels C1 plus C2 plus C3 may be added to correspond with the operator of the portable computing device 100 desiring to power up the camcorder so that video may be recorded while he or she is conducting the telephone call. Since the electrical current level of A1 plus A2 plus C1 plus C2 plus C3 fall below the instantaneous current maximum corresponding to curve 805, then these features/functions may be permitted to function by the EC manager module 26 after the EC manager module 26 determines that these features/functions do not exceed the present electrical current level tracked by curve 805.

Between times T2 and T3, the voice call has been terminated, therefore, blocks A1 and A2 representing a voice call have been removed from the graph 800. Meanwhile, during times T2 and T3, the operator of the portable computing device may have continued with the video recording as represented by electrical current level blocks C1 plus C2 plus C3 while initiating a video game application program that is represented by the electrical current levels of B1 through B5.

Since the sum of C1 through C3 and B1 through B5 electrical current levels is less than the present instantaneous present electrical current level represented by curve 805, then the EC manager module 26 may permit these functions/features to operate without any conditions (freely). Between times T3 and T4, as the instantaneous electrical current level continues to drop as represented by curve 805, then the EC manager module 26 may need to impose conditions or degrade the quality of service for particular functions and/or features in order to conserve electrical current.

For example, between times T3 and T4, while the operator of the portable computing device 100 continues to record with the camcorder features/functions, the EC manager module 26 may have reduced the recording level of the camcorder in which current level block C3 has been removed. According to this particular embodiment, the EC manager module 26 may have instructed the camcorder to reduce the number of frames it was recording per second.

Meanwhile, during the same time window between time T3 and T4, the video gaming feature is maintained at its previous current levels as represented by electrical current level blocks B1 through B5. As noted previously, video gaming as described in connection with FIG. 13 was assigned a higher priority at level "B" relative to level "C" category of the camcorder function/feature.

Next, between times T4 and T5, the operator of the portable computing device 100 decides to initiate a voice and data transmission is represented by electrical current level blocks A1 through A3. Since voice and data transmissions have a higher priority at the "A" level relative to the "B" level of video gaming and "C" level of camcorder recording, then the electrical current levels for the video gaming and the camcorder recording are reduced by the EC manager module 26 during this time period.

This downward change during the time period between time T4 and T5 is represented by blocks C1 and B1 which were changed from electrical current levels B1-B5 and C1-C2 during time period T3 and T4, respectively. The electrical current levels for the "B" and "C" category functions/features were changed during time period T4 and T5 in a downward manner in order to accommodate the higher priority voice and data transmissions as represented by electrical current level blocks A1-A3. The management by the EC manager module 26 of the functions and features of the portable computing device 100 continues similarly for time periods from T5 through T7 as understood by one of ordinary skill the art.

Figure 15:
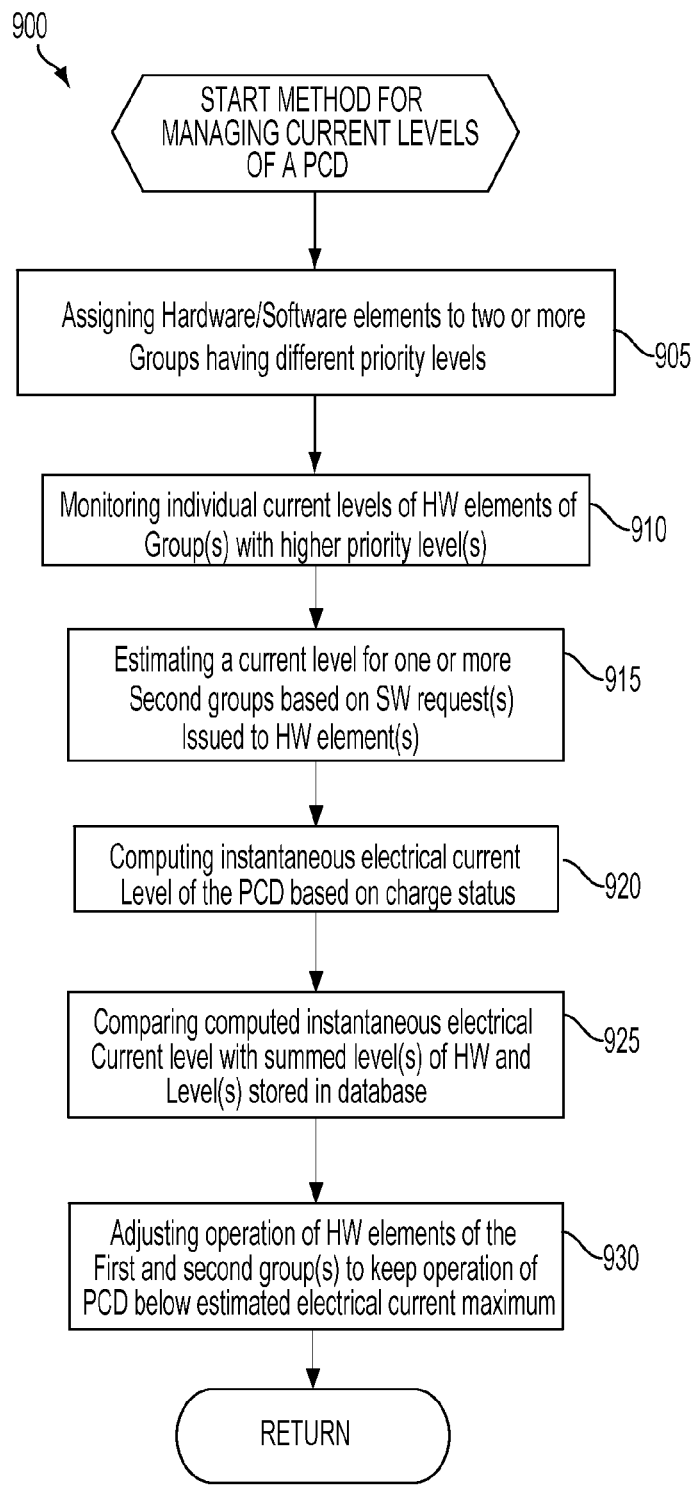
FIG. 15 is a logical flowchart illustrating a method for managing electrical current levels within a portable computing device.

FIG. 15 is a logical flowchart illustrating a method 900 for managing electrical current levels within a portable computing device 100. Block 905 is the first step of method 900. In block 905, the EC manager module 26 may assign hardware and/or software elements to two or more groups in which each group may have its respective priority level. For example, as discussed above in connection with FIG. 13, the EC manager module 26 may assign voice calls according to a level "A" priority while gaming functions are assigned to a level "B" priority in which the level "B" priority is lower relative to the level "A" priority and so on. The EC manager module 26 may perform these assignments automatically and adjust these assignments periodically. Alternatively, the EC manager module 26 may be provided with these assignments from preloaded memory 112A created at the factory for the PCD 100. In other exemplary embodiments, an operator of the portable computing device 100 may be provided with options for selecting how hardware and/or software elements are assigned priority by the EC manager module 26.

Next, in block 910, the EC manager module 26 may monitor individual electrical current levels of hardware elements assigned to higher priority levels. For example, as described above in connection with FIG. 13, the EC manager module 26 may monitor the current levels of all hardware elements assigned to the highest priority level "A" category. Meanwhile, the EC manager module 26 may only track an estimated amount of electrical current levels for those hardware elements assigned to the lower categories, such as the level "B" category and the level "C" category. The EC manager module 26 is not limited to monitoring individual hardware elements of a single category/priority/class. The EC manager module 26 is capable of monitoring electrical current levels of individual hardware elements for all categories/priorities as well as various combinations of categories/priorities.

Next, in block 915, the EC manager module 26 may estimate an electrical current level for one or more second groups based on software requests issued to various hardware elements. In other words, the EC manager module 26 may estimate electrical current levels for those hardware elements of the PCD 100 which may be assigned to lower priority groups, such as the "B" and "C" category groups illustrated in FIG. 13 and described above.

In block 920, the EC manager module 26 may calculate the instantaneous electrical current level of the PCD 100 based on its current charge status. In this block 920, the EC manager module 26 may be utilizing the data illustrated in graph 600 of FIG. 12. The EC manager module 26 may determine the current operating temperature of the PCD 100 and then utilize charge data corresponding to the appropriate curve 405, 410. The EC manager module 26 also utilizes EQ1 described above once it has obtained data for all of the variables needed to solve this EQ1 for instantaneous electrical current levels.

In block 925, the EC manager module 26 may compare the calculated instantaneous electrical current level from block 920 with the monitored electrical current levels from block 910 and the estimated electrical current levels from block 915. All of these electrical current levels may be stored in the database 112B. Specifically, in this block 925, the EC manager module 26 compares the calculated instantaneous electrical current level with the minimum current level column 520 and the operation level column 510 tabulated in table 500 of FIG. 11. Based on the use cases listed in column 515, the EC manager module 26 then reviews the electrical current levels of the various hardware elements of the various groups.

In block 930, the EC manager module 26 may adjust operation of the hardware elements of the first and second groups in order to keep operation of the PCD 100 below the estimated electoral current maximum calculated in block 920. The EC manager module 26 may then issue commands to various hardware elements through the resource power manager 180 that correspond with the use cases listed in column 515 of table 500. The hardware commands issued by the EC manager module 26 may include, but are not limited to, those such as "high," "low," "medium," "level 1," "level 2," "level 3," "turbo," "non-turbo," etc. etc. Such commands may be characterized as ones of degree relative to the operation of the hardware element. The process 900 then returns.

As understood by one of ordinary skill in the art, the EC manager 26 may adjust the relative electrical current level of the PCD 100 up or down. All of the examples described above show cases where the battery 188 is draining. If the PCD 100 is connected to a charger or other type of power device, then the EC manager 188 may relax the operation and allow one or more groups to operate at a higher electrical current consuming level.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing electrical current within a portable computing device ("PCD"), the method comprising:
assigning a priority to two or more communications supported by the PCD which may overlap in drawing power during a transmission;
monitoring a present level of a power supply for the PCD;
determining if the two or more communications which may overlap in drawing power during the transmission may be transmitted at the present level of the power supply;
if the two or more communications which may overlap in drawing power during the transmission cannot be transmitted at the present level of the power supply, then determining if a timing of at least one of the communications may be adjusted;
if the timing of the at least one of the communications may be adjusted, then calculating a timing offset for the at least one of the communications;
determining if the two or more communications may be transmitted at the present level of the power supply and with the timing offset so that power drawn for the communications is offset; and
determining a theoretical power level adjustment for at least one of the communications if the two or more communications cannot be simultaneously transmitted at the present level of the power supply and with the timing offset.

2. The method of claim 1, further comprising transmitting the two or more communications with the timing offset.

3. The method of claim 1, further comprising determining if the two or more communications may be transmitted at the present level of the power supply and the theoretical power level adjustment.

4. The method of claim 3, further comprising transmitting the two or more communications with the power level adjustment.

5. The method of claim 1, further comprising accessing a table comprising power level adjustment values to determine a theoretical power level adjustment for at least one of the communications if the two or more communications cannot be simultaneously transmitted at the present level of the power supply and with the timing offset.

6. The method of claim 5, wherein the table comprises power level adjustment values which are associated with communications according to the priority.

7. The method of claim 1, further comprising sending a message to an electrical current manager that requests one or more power adjustments to be made in one or more other resources in the PCD if the number of timing offsets and/or the number of power level adjustments has reached a predetermined threshold.

8. The method of claim 7, further comprising applying one or more power adjustments to the one or more other resources in the PCD.

9. The method of claim 1, wherein the portable computing device comprises at least one of a mobile telephone, a personal digital assistant, a pager, a smartphone, a navigation device, and a hand-held computer with a wireless connection or link.

10. A computer system for managing electrical current within a portable computing device ("PCD"), the system comprising:
a processor for:
assigning a priority to two or more communications supported by the PCD and which may overlap in drawing power during a transmission;
monitoring a present level of a power supply for the PCD;
determining if the two or more communications which may overlap in drawing power during the transmission may be transmitted at the present level of the power supply;
if the two or more communications which may overlap in drawing power during the transmission cannot be transmitted at the present level of the power supply, then determining if a timing of at least one of the communications may be adjusted;
if the timing of the at least one of the communications may be adjusted, then calculating a timing offset for the at least one of the communications;
determining if the two or more communications may be transmitted at the present level of the power supply and with the timing offset so that power drawn for the communications is offset; and
determining a theoretical power level adjustment for at least one of the communications if the two or more communications cannot be simultaneously transmitted at the present level of the power supply and with the timing offset.

11. The system of claim 10, wherein the processor is further operable for transmitting the two or more communications with the timing offset.

12. The system of claim 10, wherein the processor is operable for determining if the two or more communications may be transmitted at the present level of the power supply and the theoretical power level adjustment.

13. The system of claim 12, wherein the processor is operable for transmitting the two or more communications with the power level adjustment.

14. The system of claim 10, wherein the processor is operable for accessing a table comprising power level adjustment values to determine a theoretical power level adjustment for at least one of the communications if the two or more communications cannot be simultaneously transmitted at the present level of the power supply and with the timing offset.

15. The system of claim 14, wherein the table comprises power level adjustment values which are associated with communications according to the priority.

16. The system of claim 10, wherein the processor is further operable for sending a message to an electrical current manager that requests one or more power adjustments to be made in one or more other resources in the PCD if the number of timing offsets and/or the number of power level adjustments has reached a predetermined threshold.

17. The system of claim 16, wherein the processor is operable for applying one or more power adjustments to the one or more other resources in the PCD.

18. The system of claim 10, wherein the portable computing device comprises at least one of a mobile telephone, a personal digital assistant, a pager, a smartphone, a navigation device, and a hand-held computer with a wireless connection or link.

19. A computer system for managing one or more memory resources of a wireless handheld computing device, the system comprising:
means for assigning a priority to two or more communications supported by the PCD which may overlap in drawing power during a transmission;
means for monitoring a present level of a power supply for the PCD;

means for determining if the two or more communications which may overlap in drawing power during a transmission may be transmitted at the present level of the power supply;

means for determining if the two or more communications which may overlap in drawing power during a transmission cannot be transmitted at the present level of the power supply;

means for determining if a timing of at least one of the communications may be adjusted;

means for calculating a timing offset for the at least one of the communications if the timing of the at least one of the communications may be adjusted;

means for determining if the two or more communications may be transmitted at the present level of the power supply and with the timing offset so that power drawn for the communications is offset; and means for determining a theoretical power level adjustment for at least one of the communications if the two or more communications cannot be simultaneously transmitted at the present level of the power supply and with the timing offset.

20. The system of claim 19, further comprising means for transmitting the two or more communications with the timing offset.

21. The system of claim 19, further comprising determining if the two or more communications may be transmitted at the present level of the power supply and the theoretical power level adjustment.

22. The system of claim 21, further comprising means for transmitting the two or more communications with the power level adjustment.

23. The system of claim 19, further comprising means for accessing a table comprising power level adjustment values to determine a theoretical power level adjustment for at least one of the communications if the two or more communications cannot be simultaneously transmitted at the present level of the power supply and with the timing offset.

24. The system of claim 23, wherein the table comprises power level adjustment values which are associated with communications according to the priority.

25. The system of claim 19, further comprising means for sending a message to an electrical current manager that requests one or more power adjustments to be made in one or more other resources in the PCD if the number of timing offsets and/or the number of power level adjustments has reached a predetermined threshold.

26. The system of claim 25, further comprising means for applying one or more power adjustments to the one or more other resources in the PCD.

27. The system of claim 19, wherein the portable computing device comprises at least one of a mobile telephone, a personal digital assistant, a pager, a smartphone, a navigation device, and a hand-held computer with a wireless connection or link.

28. A computer program product comprising a non-transitory computer usable medium having a computer readable program code embodied therein, said computer readable program code adapted to be executed to implement a method for managing electrical current within a portable computing device ("PCD"), said method comprising:

assigning a priority to two or more communications supported by the PCD and which may overlap in drawing power during a transmission;

monitoring a present level of a power supply for the PCD;

determining if the two or more communications which may overlap in drawing power during the transmission may be transmitted at the present level of the power supply;

if the two or more communications which may overlap in drawing power during the transmission cannot be transmitted at the present level of the power supply, then determining if a timing of at least one of the communications may be adjusted;

if the timing of the at least one of the communications may be adjusted, then calculating a timing offset for the at least one of the communications;

determining if the two or more communications may be transmitted at the present level of the power supply and with the timing offset so that power drawn for the communications is offset; and determining a theoretical power level adjustment for at least one of the communications if the two or more communications cannot be simultaneously transmitted at the present level of the power supply and with the timing offset.

29. The computer program product of claim 28, wherein the program code implementing the method further comprises:

transmitting the two or more communications with the timing offset.

30. The computer program product of claim 28, wherein the program code implementing the method further comprises:

determining if the two or more communications may be transmitted at the present level of the power supply and the theoretical power level adjustment.

31. The computer program product of claim 30, wherein the program code implementing the method further comprises:

transmitting the two or more communications with the power level adjustment.

32. The computer program product of claim 28, wherein the program code implementing the method further comprises:

accessing a table comprising power level adjustment values to determine a theoretical power level adjustment for at least one of the communications if the two or more communications cannot be simultaneously transmitted at the present level of the power supply and with the timing offset.

33. The computer program product of claim 32, wherein the table comprises power level adjustment values which are associated with communications according to the priority.

34. The computer program product of claim 28, wherein the program code implementing the method further comprises:

sending a message to an electrical current manager that requests one or more power adjustments to be made in one or more other resources in the PCD if the number of timing offsets and/or the number of power level adjustments has reached a predetermined threshold.

35. The computer program product of claim 34, applying one or more power adjustments to the one or more other resources in the PCD.

36. The computer program product of claim 28, wherein the portable computing device comprises at least one of a mobile telephone, a personal digital assistant, a pager, a smartphone, a navigation device, and a hand-held computer with a wireless connection or link.

* * * * *